INVENTORS
GEORGE E. CAME
HARRY M. SIMMONS

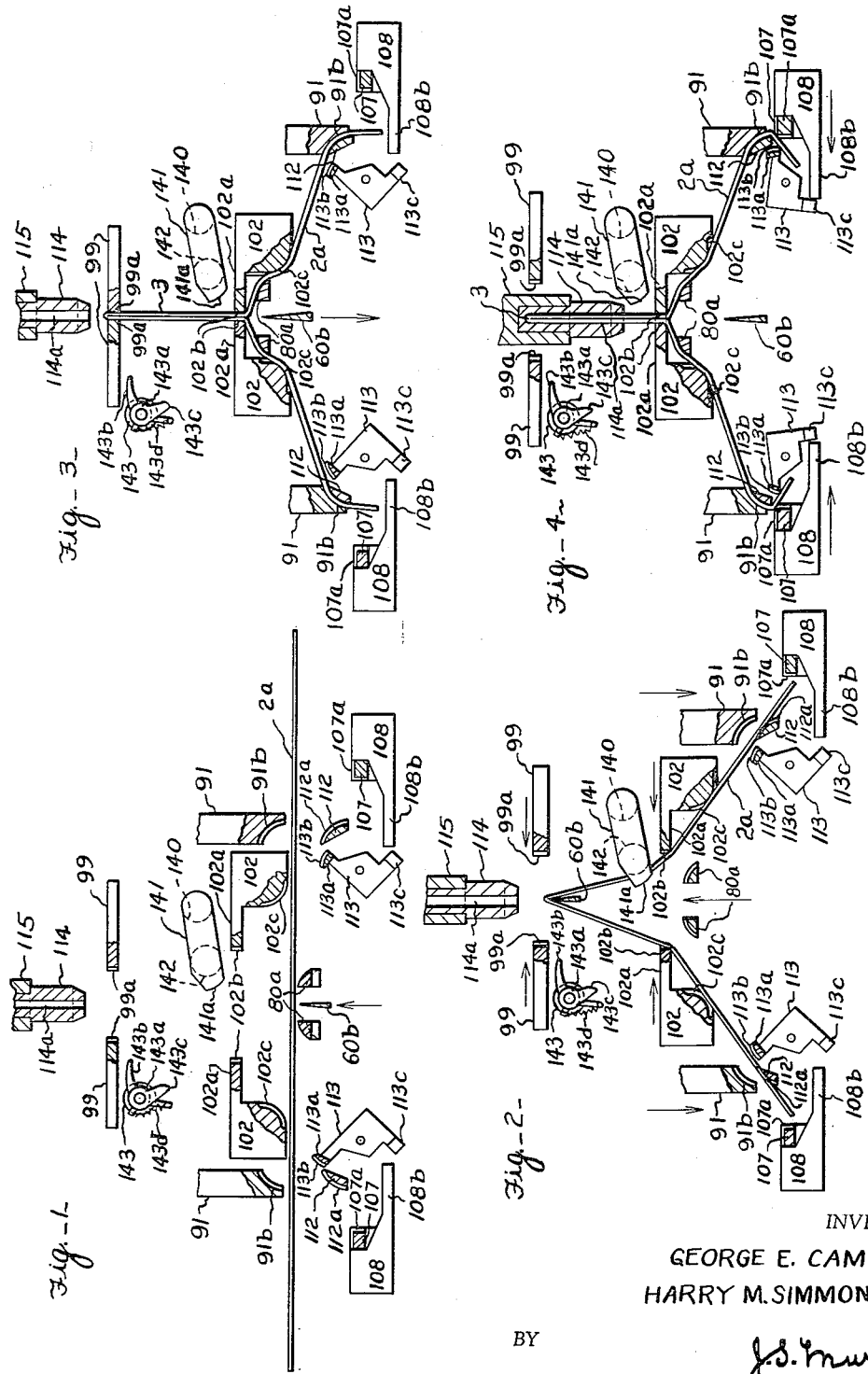

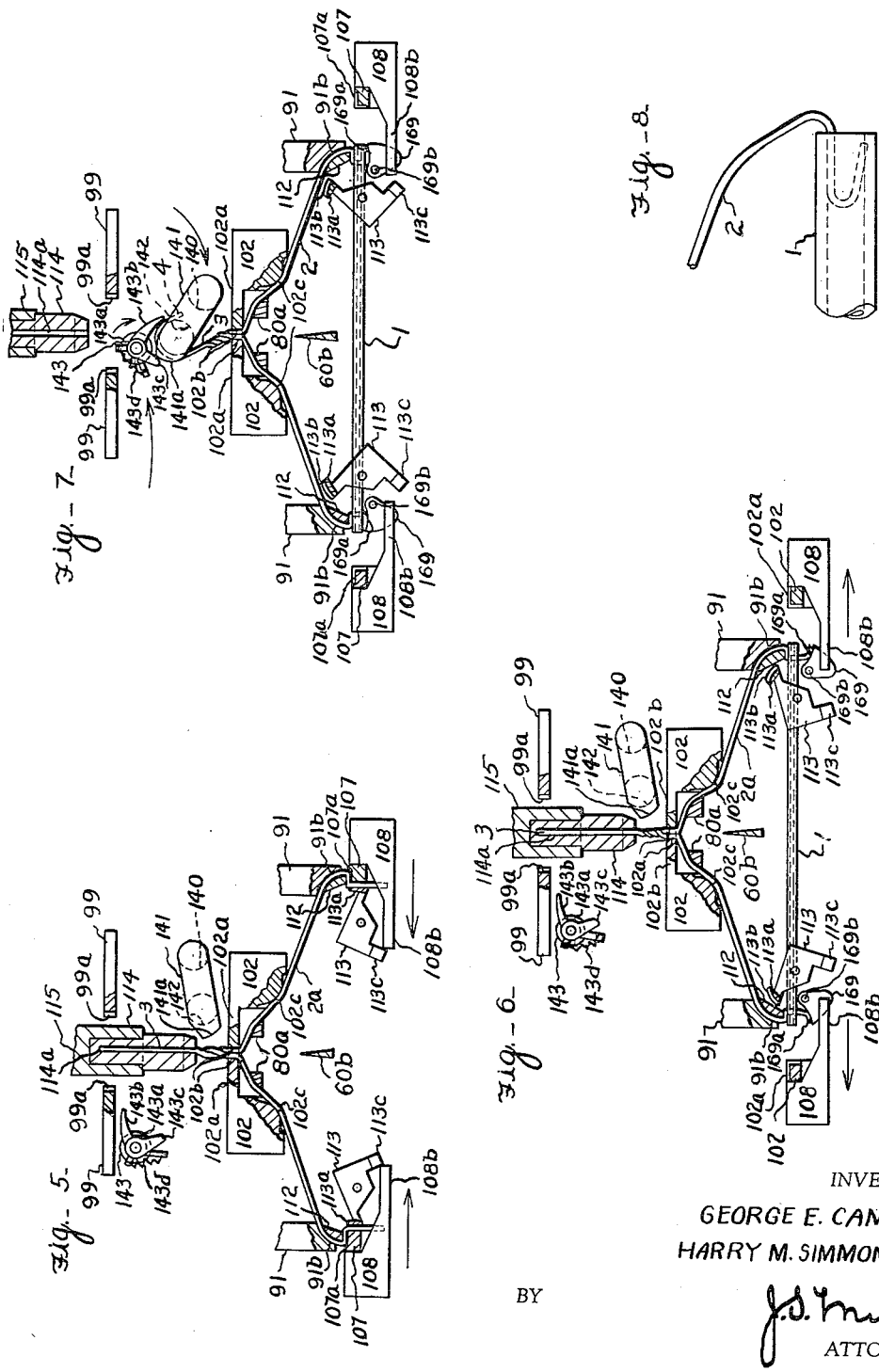

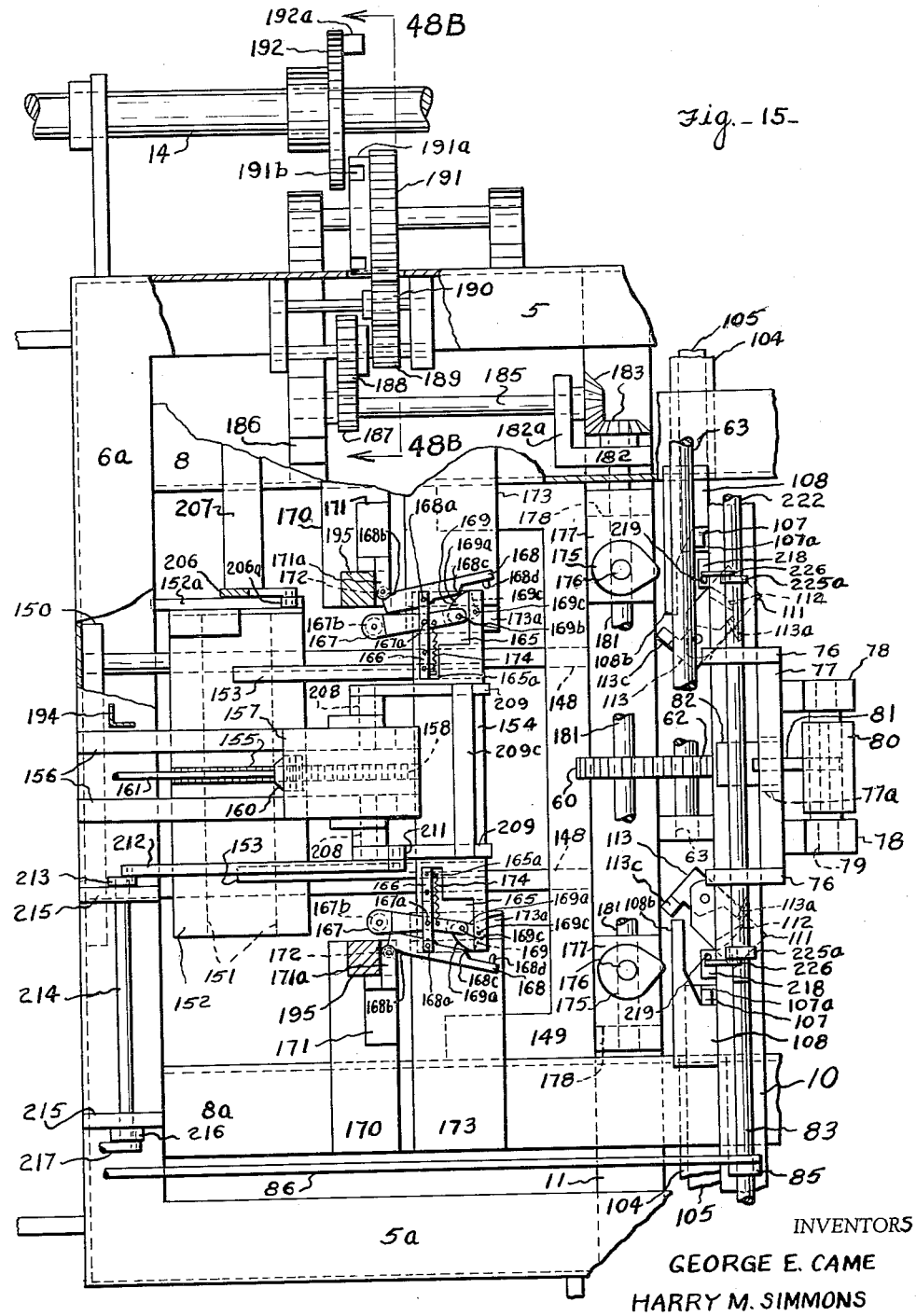

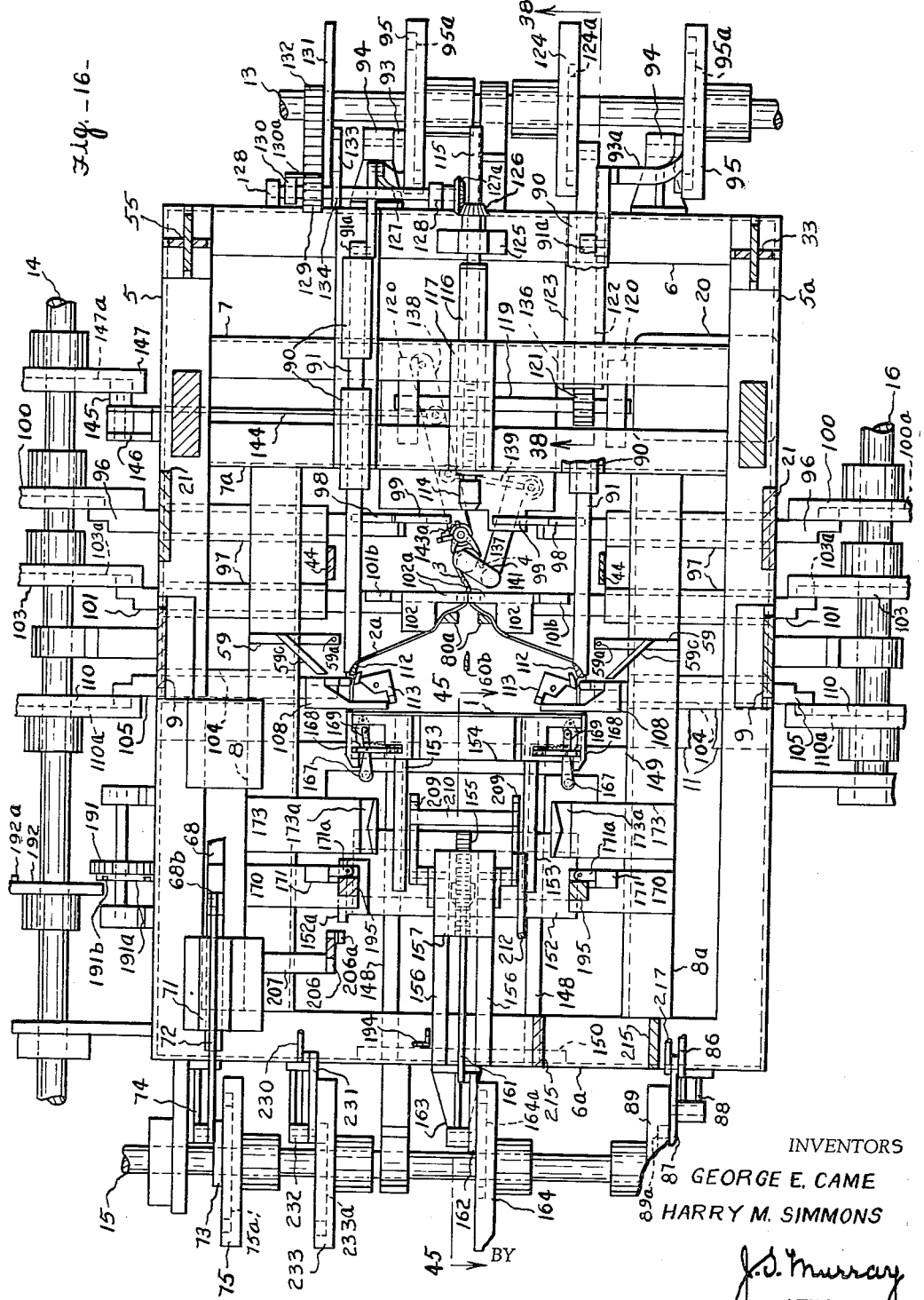
Fig.-16-
INVENTORS
GEORGE E. CAME
HARRY M. SIMMONS
BY
J.S. Murray
ATTORNEY

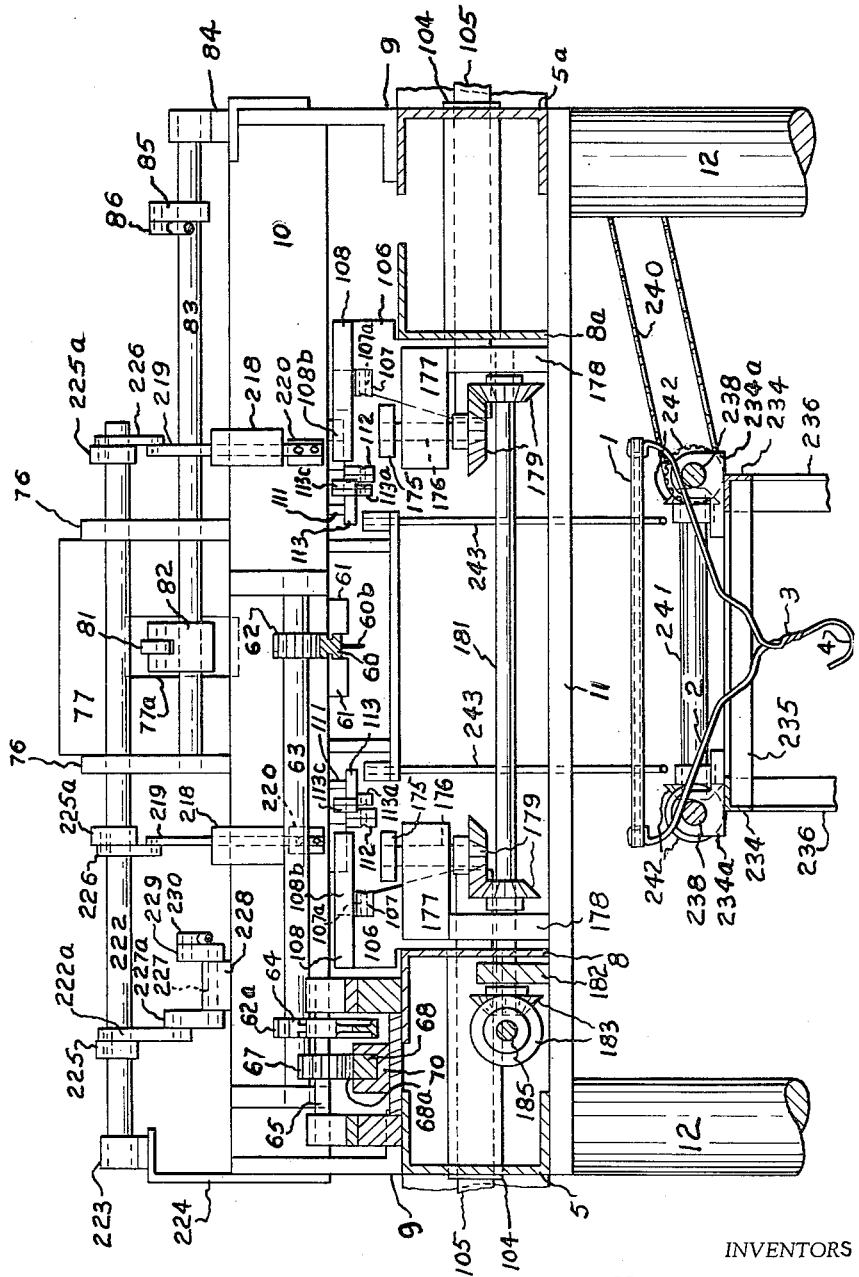

July 31, 1962 G. E. CAME ET AL 3,047,031
MACHINE FOR MAKING GARMENT HANGERS
Filed June 27, 1955 20 Sheets-Sheet 11
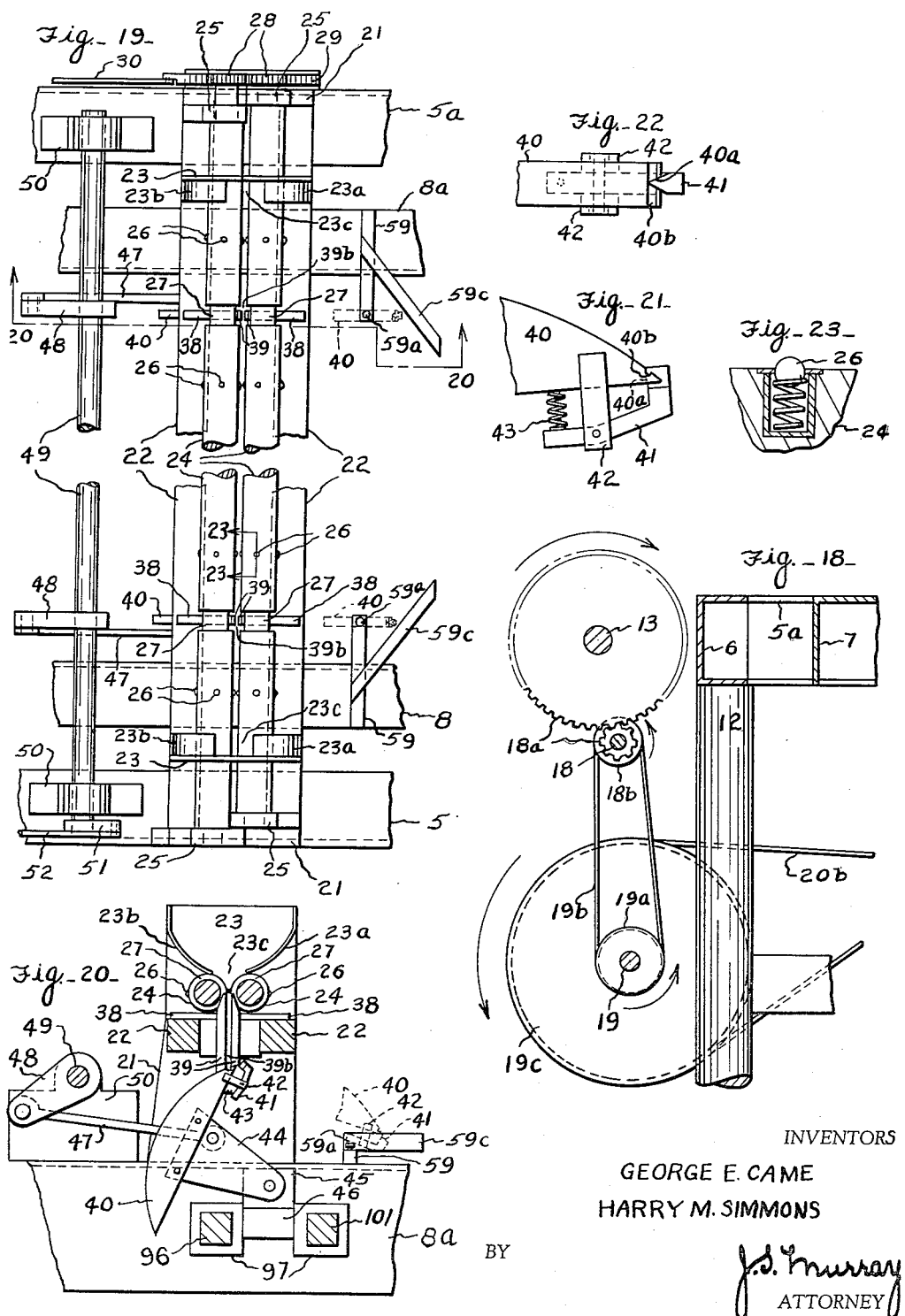
INVENTORS
GEORGE E. CAME
HARRY M. SIMMONS

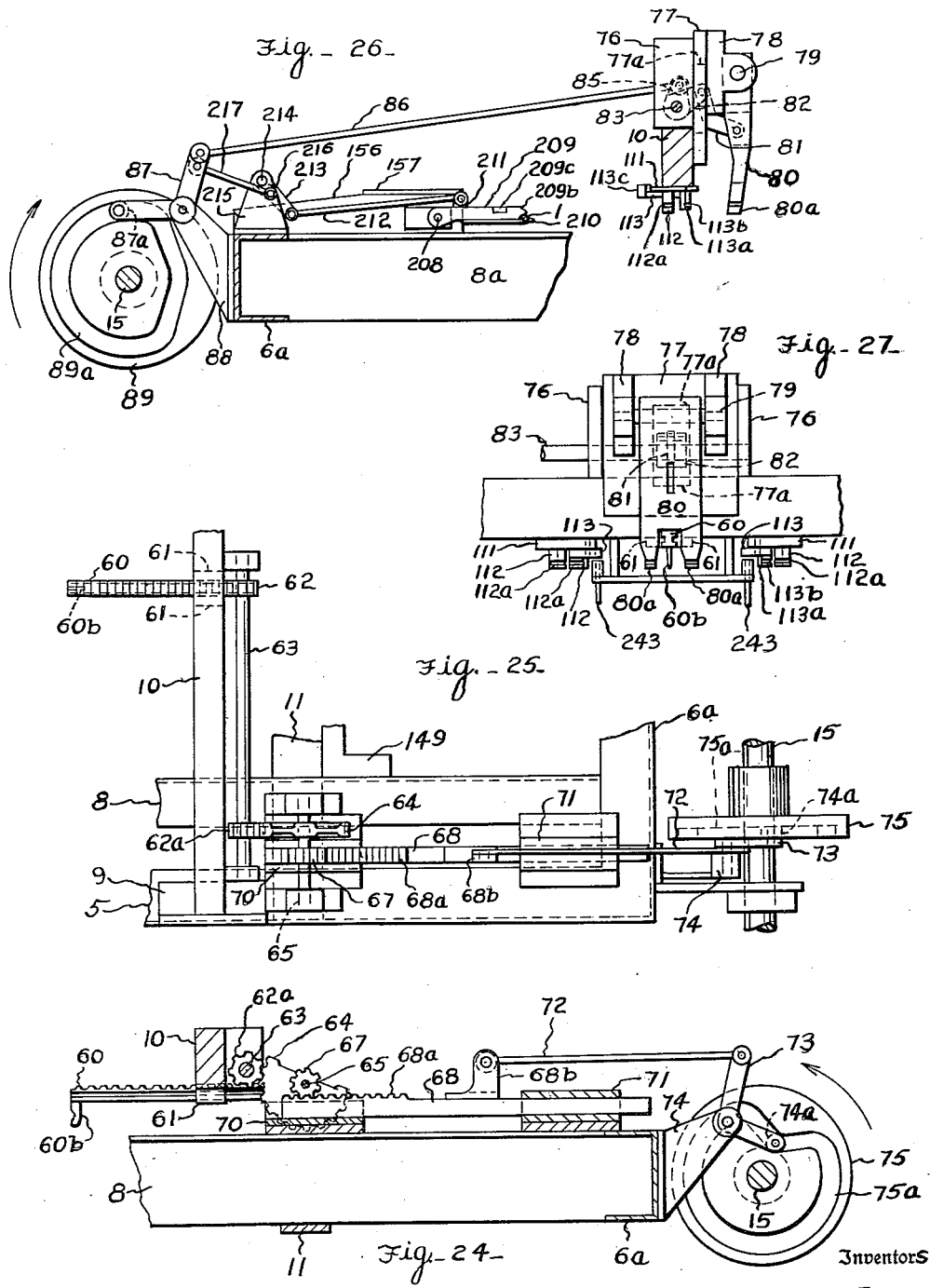

July 31, 1962   G. E. CAME ET AL   3,047,031
MACHINE FOR MAKING GARMENT HANGERS
Filed June 27, 1955   20 Sheets-Sheet 13
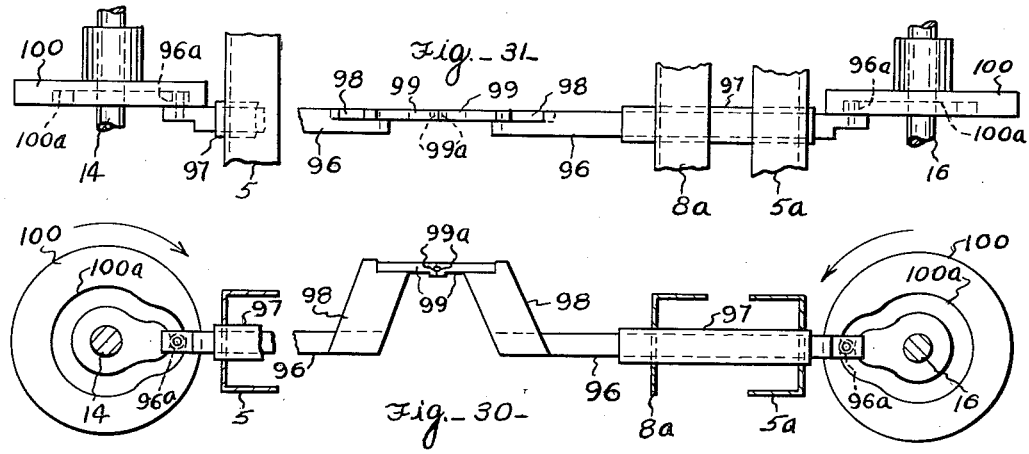
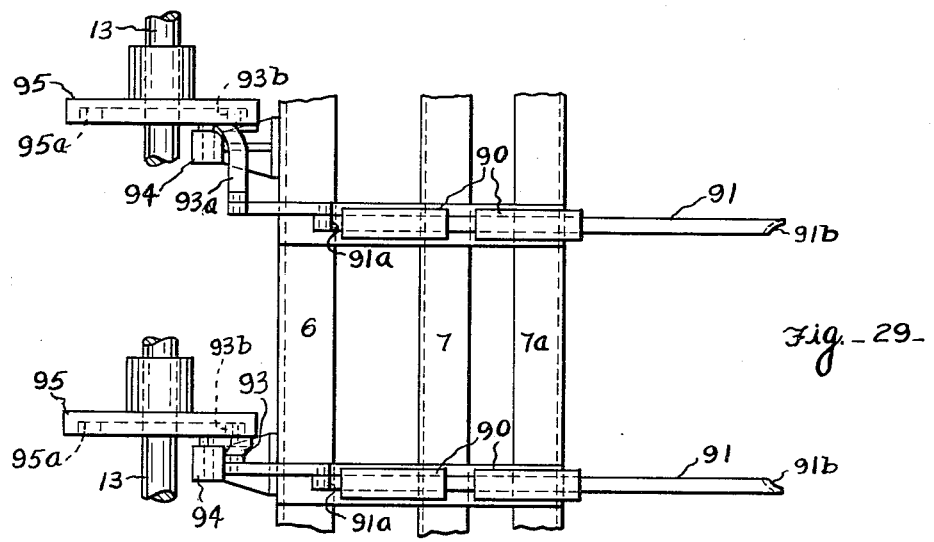
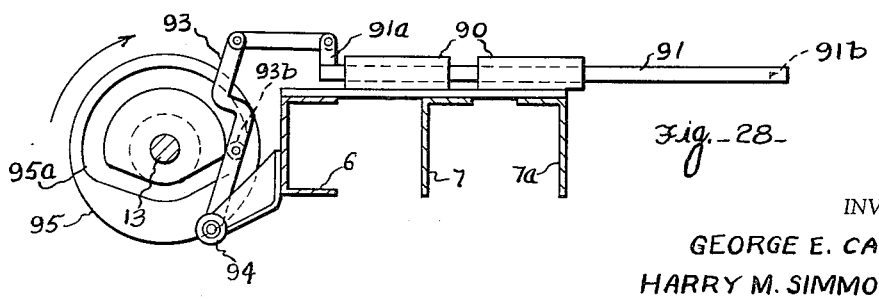
INVENTORS
GEORGE E. CAME
HARRY M. SIMMONS
BY
J. S. Murray
ATTORNEY

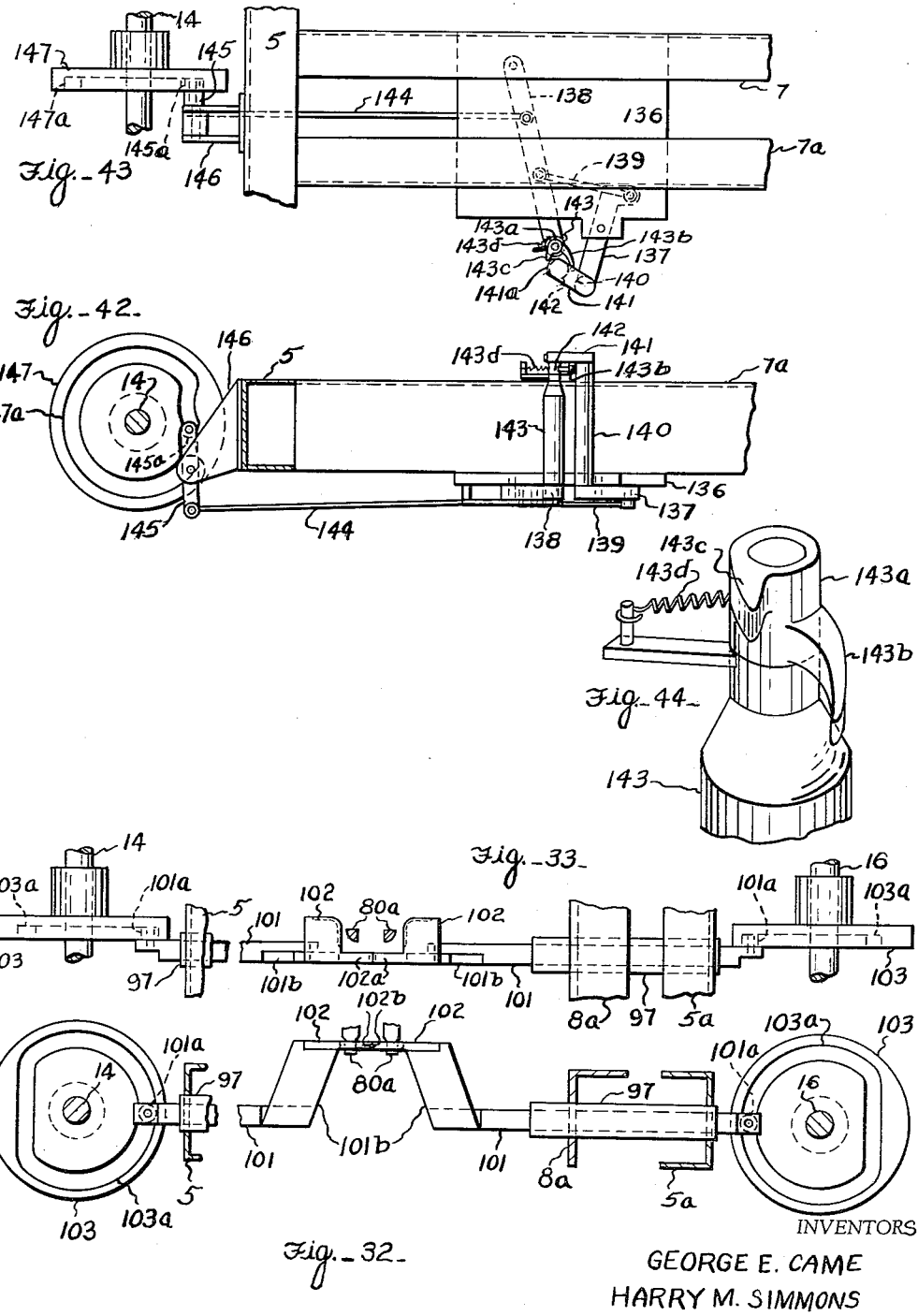

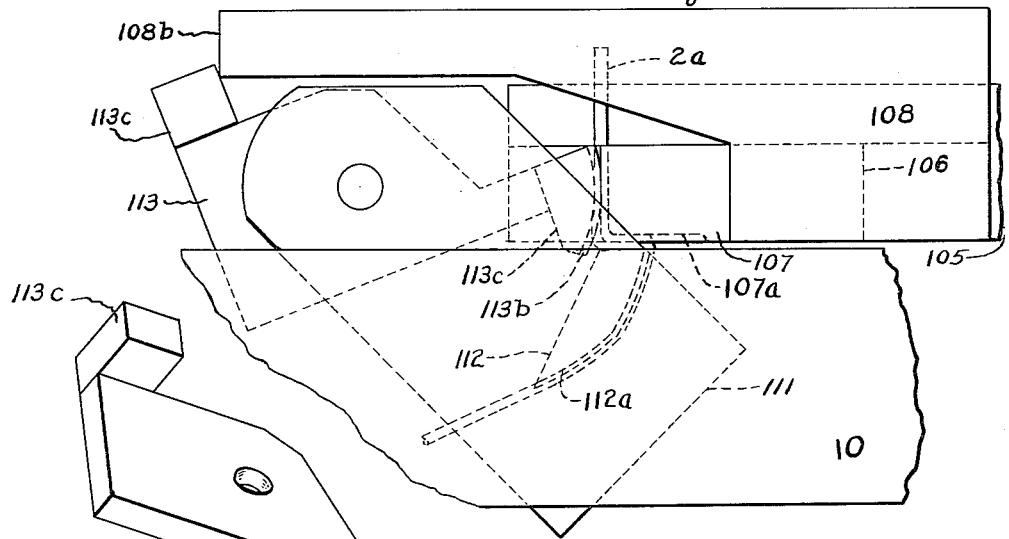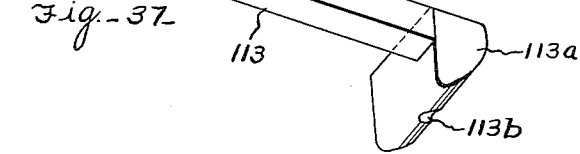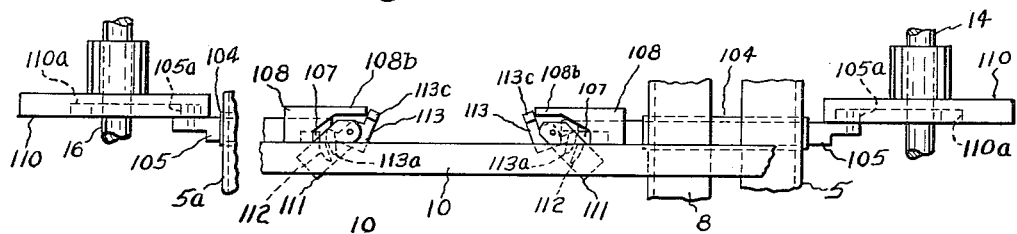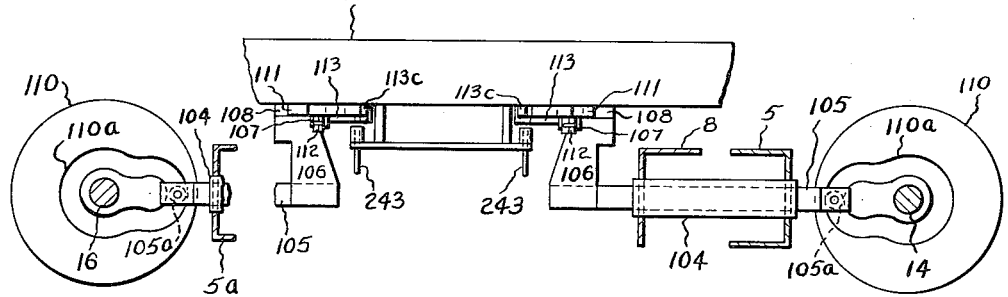

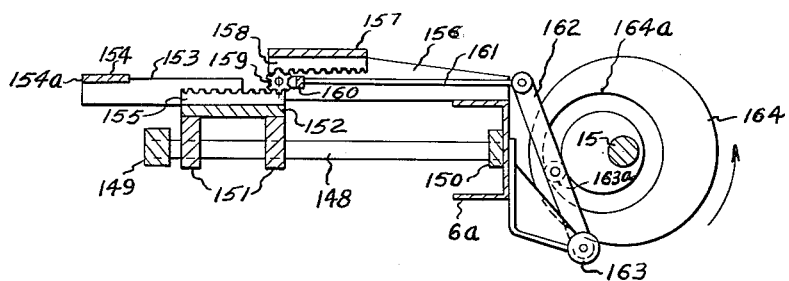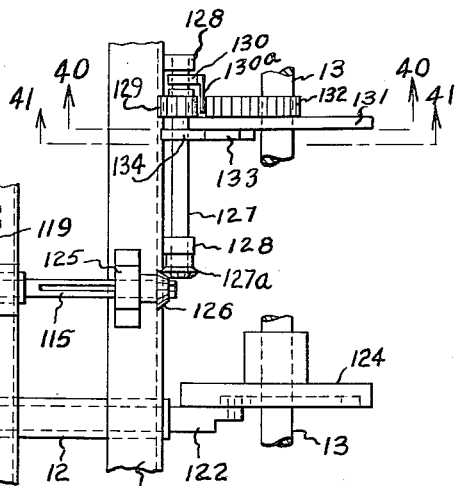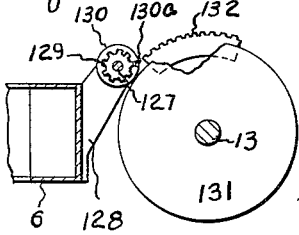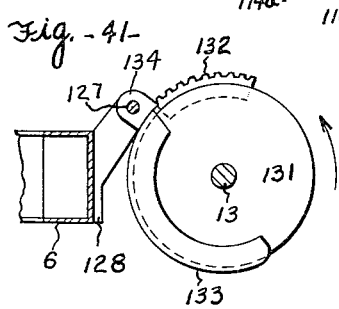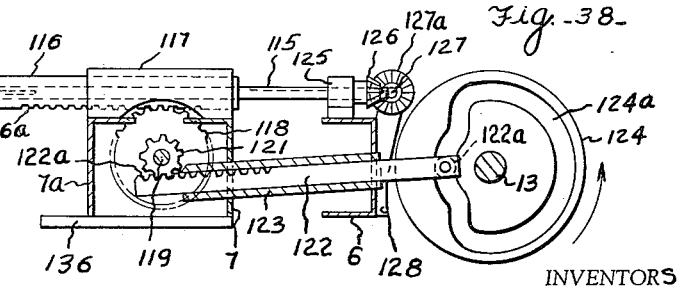

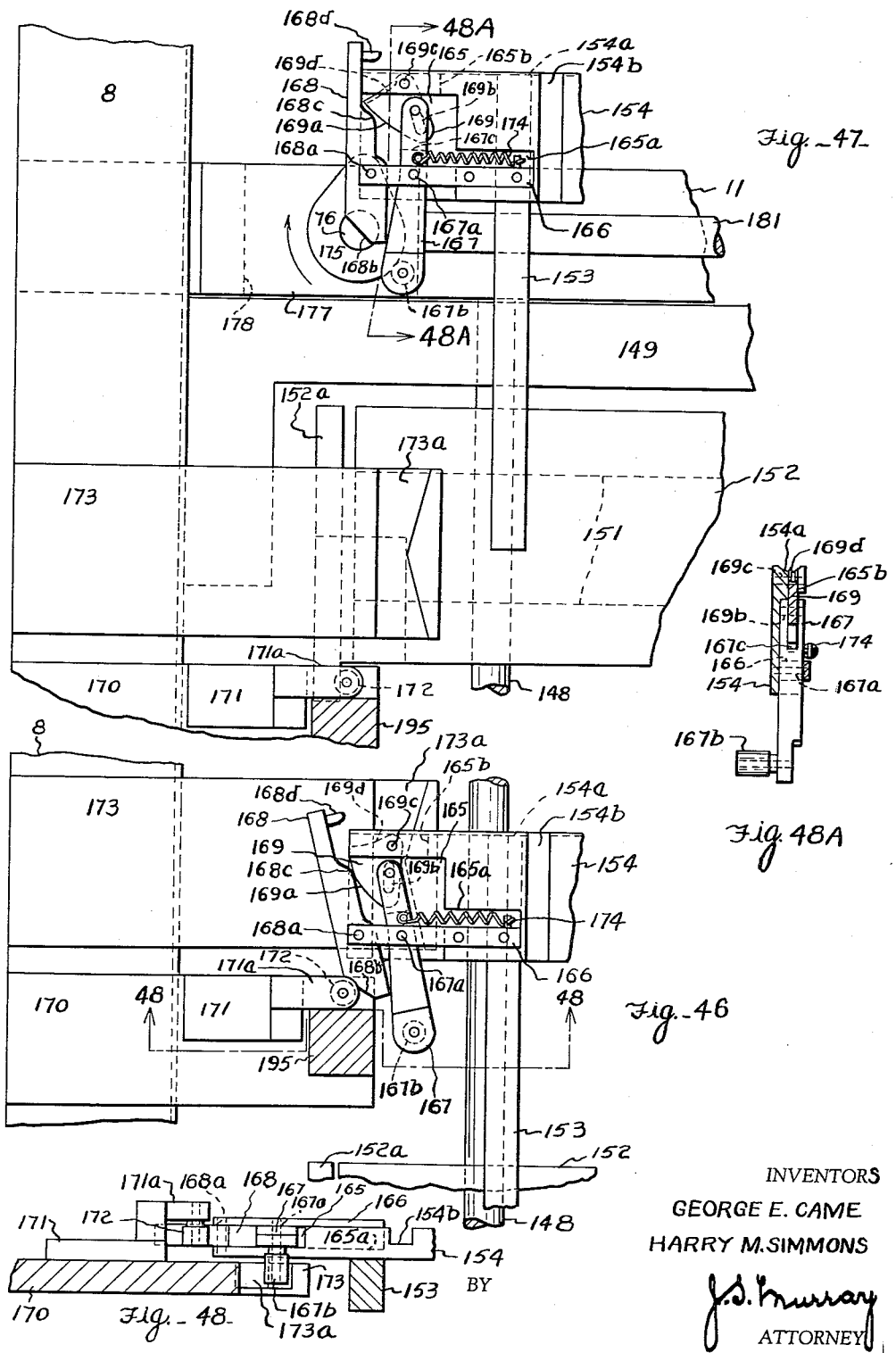

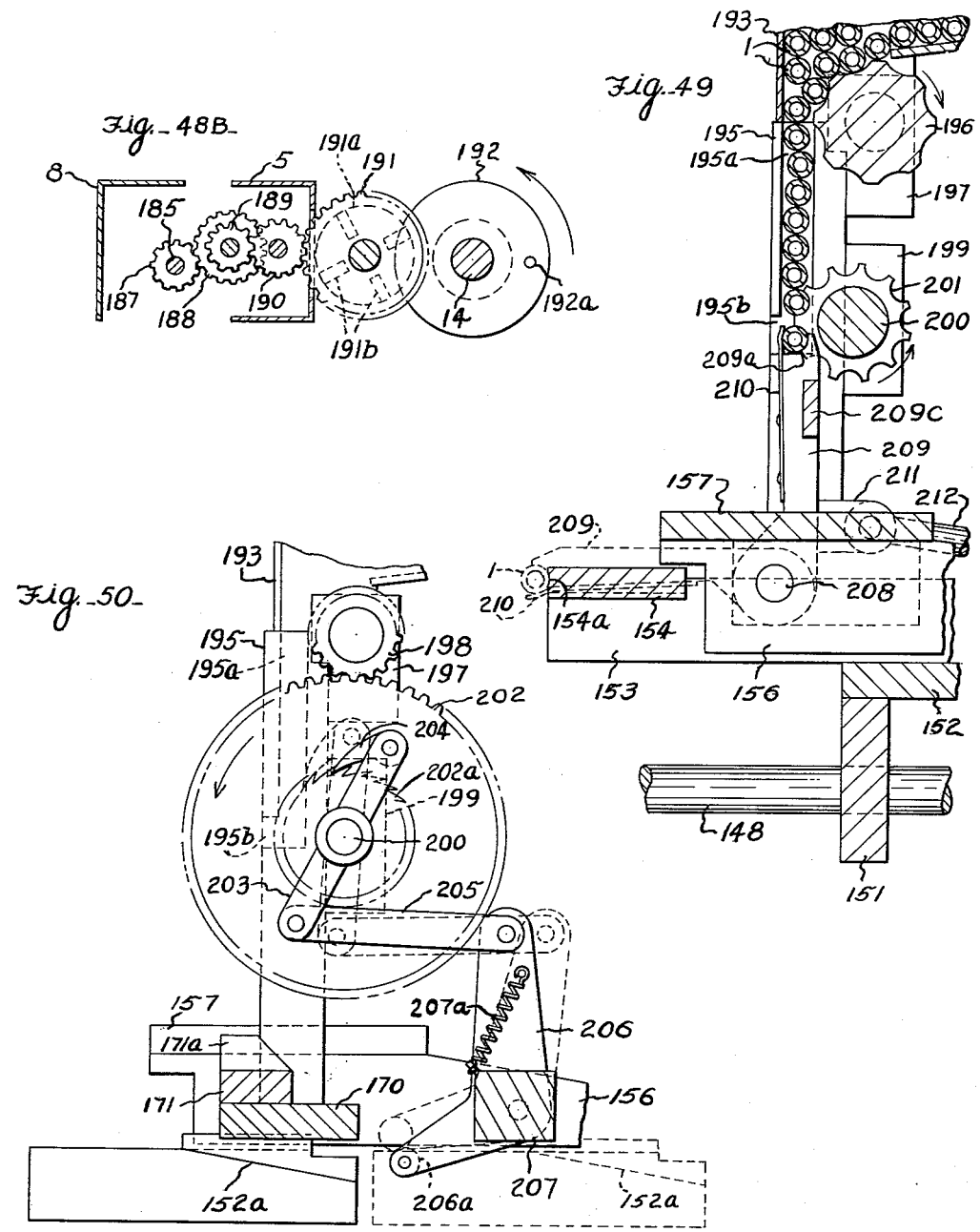

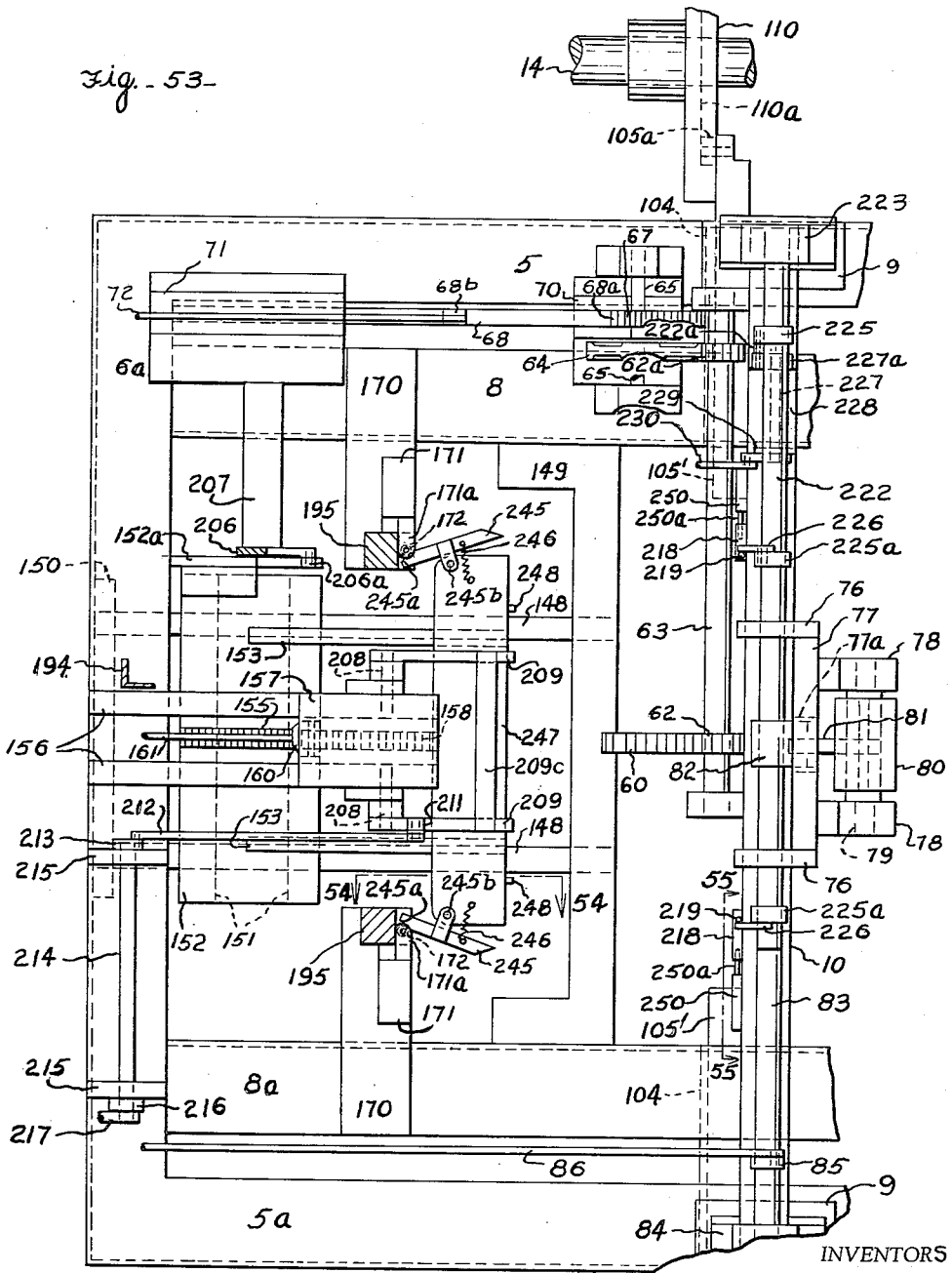

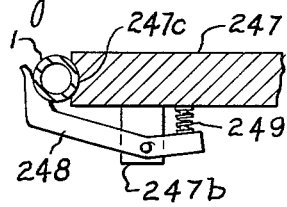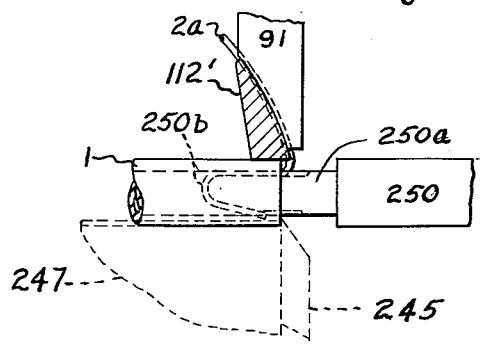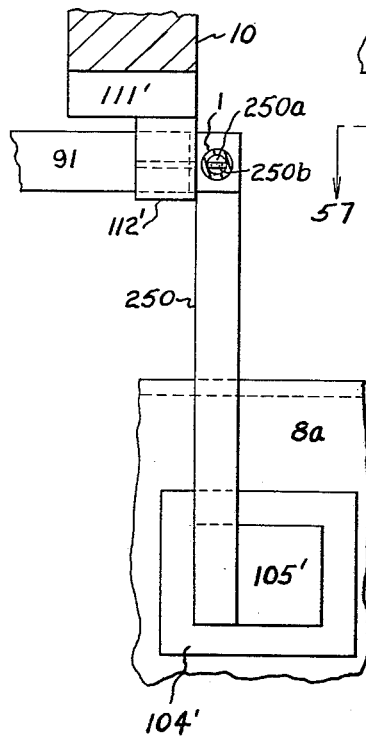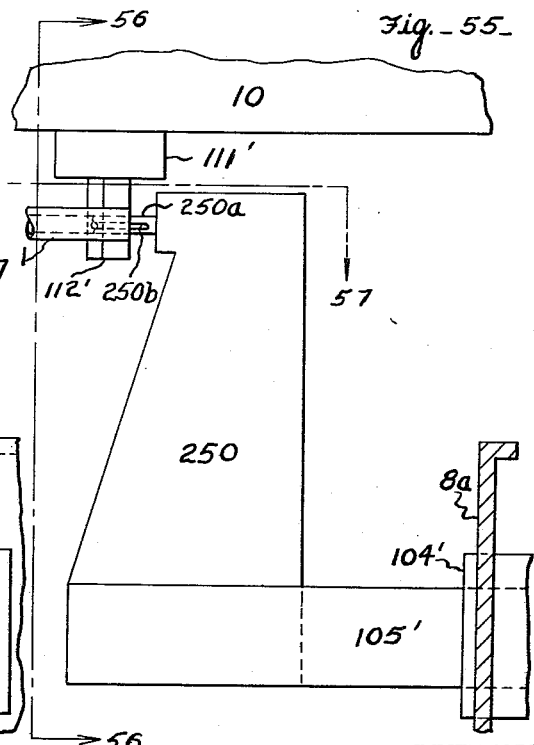

United States Patent Office 3,047,031
Patented July 31, 1962

3,047,031
MACHINE FOR MAKING GARMENT HANGERS
George E. Came, Gadsden, Ala., and Harry M. Simmons, Ann Arbor, Mich., assignors to Cleaners Hanger Company, Detroit, Mich., a corporation of Michigan
Filed June 27, 1955, Ser. No. 518,038
19 Claims. (Cl. 140—81.5)

This invention relates to machines for making garment hangers and particularly for attaching the ends of a strut to and between the downwardly divergent arms of a wire hanger member. Such garment hangers are well known, their primary advantage being seating areas of a width adequate to avoid wrinkling or creasing of a garment hung on the strut. Production of such hangers has heretofore been unduly laborious and expensive due to necessity of manually assembling the hanger members and struts.

An object of the invention is to provide a machine that will rapidly and continuously form the wire members from suitable blanks and will then immediately attach the struts, greatly reducing the time and labor required for manual assembly, and achieving a stronger and more uniform product.

Another object is to adapt a machine to form on the ends of the wire arms a pair of strut attachment means and to securely engage such means with the strut ends.

Another object is to provide mechanism for periodically feeding struts from a suitable hopper and delivering them to the wire members at a definite assembly position.

Another object is to provide mechanism for automatically clinching the wire members to the struts in said assembly position.

Another object is to provide an improved mechanism for ejecting the completed hangers from the machine.

Another object is to establish a proper sequential relation between the various mechanisms incorporated in the machine.

These and various other objects are attained by the construction hereinafter described and illustrated in the accompanying drawings, wherein:

FIGS. 1–7 are diagrammatic top plan views showing various successive stages in the formation of a wire hanger member from a straight blank, and in the attachment of a strut to such member, and further showing the varying relation to such member of dies effecting its progressive formation.

FIG. 8 is a fragmentary detail of a connection between the wire member and strut of a hanger modified from the connections appearing in FIG. 7.

FIG. 15 is a horizontal section of the rear portion of the machine, taken on the line 15—15 of FIG. 12.

FIG. 16 is a horizontal sectional top plan view taken on the line 16—16 of FIG. 12, showing the machine with various upper portions eliminated.

FIG. 17 is a vertical cross section taken on the line 17—17 of FIG. 10.

FIG. 18 is a vertical fragmentary section on 18—18 of FIG. 9 showing a drive mechanism for one of the main cam shafts.

FIG. 19 is a fragmentary top plan, particularly showing a hopper receiving the wire blanks, and mechanism for feeding such blanks singly downward.

FIG. 20 is a vertical cross sectional view of the same, taken on the line 20—20 of FIG. 19.

FIG. 21 is a fragmentary enlargement of a portion of the feed mechanism appearing in FIG. 20, showing such mechanism in an intermediate position.

FIG. 22 is a top plan view of the parts appearing in FIG. 21.

FIG. 23 is a sectional detail of a roller-mounted spring-loaded ball, taken on the line 23—23 of FIG. 19.

FIG. 24 is a vertical sectional view taken on the line 24—24 of FIG. 10, and showing a drive mechanism for a rack bar reciprocatory longitudinally and medially of the machine and carrying a forming element which initiates the shaping of wire blanks.

FIG. 25 is a fragmentary top plan view of such mechanism.

FIG. 26 is a fragmentary vertical section on the line 26—26 of FIG. 10, showing a mechanism for fashioning the previously diverged arms of a wire member with duplicate shoulders on their inner portions.

FIG. 27 is a front view of said mechanism, as indicated by the line 27—27 of FIG. 10.

FIG. 28 is a fragmentary vertical section on 28—28 of FIG. 9, showing a pair of forming elements and mechanism for reciprocating them longitudinally of the machine to form initial bends in the ends of the wire arms.

FIG. 29 is a top plan view of the same.

FIG. 30 is a fragmentary vertical section on 30—30 of FIG. 9, showing a pair of jaws and their actuating mechanism for applying clamping pressure to the shank near its return-bent free end to establish the doubled lengths in close mutual proximity.

FIG. 31 is a top plan view of the same.

FIG. 32 is a fragmentary vertical sectional view taken on 32—32 of FIG. 9, and showing oppositely acting duplicate forming members which contribute to fashioning shoulders on the inner portions of the divergent wire arms.

FIG. 33 is a top plan view of the mechanism shown by FIG. 32.

FIG. 34 is a fragmentary vertical sectional view taken on 34—34 of FIG. 10 and showing a pair of additional formers taking effect on the ends of the wire arms.

FIG. 35 is a top plan view of the mechanisms shown by FIG. 34.

FIG. 36 is an enlargement of one of the paired mechanisms appearing in FIG. 35.

FIG. 37 is a perspective view of a pivotal element appearing in FIGS. 35 and 36.

FIG. 38 is a fragmentary vertical section on the line 38—38 of FIG. 16, showing mechanism for twisting the doubled shank.

FIG. 39 is a top plan view of the mechanism appearing in FIG. 38.

FIGS. 40 and 41 are vertical sections taken on the lines 40—40 and 41—41 of FIG. 39, further showing said twisting mechanism.

Figure 9:
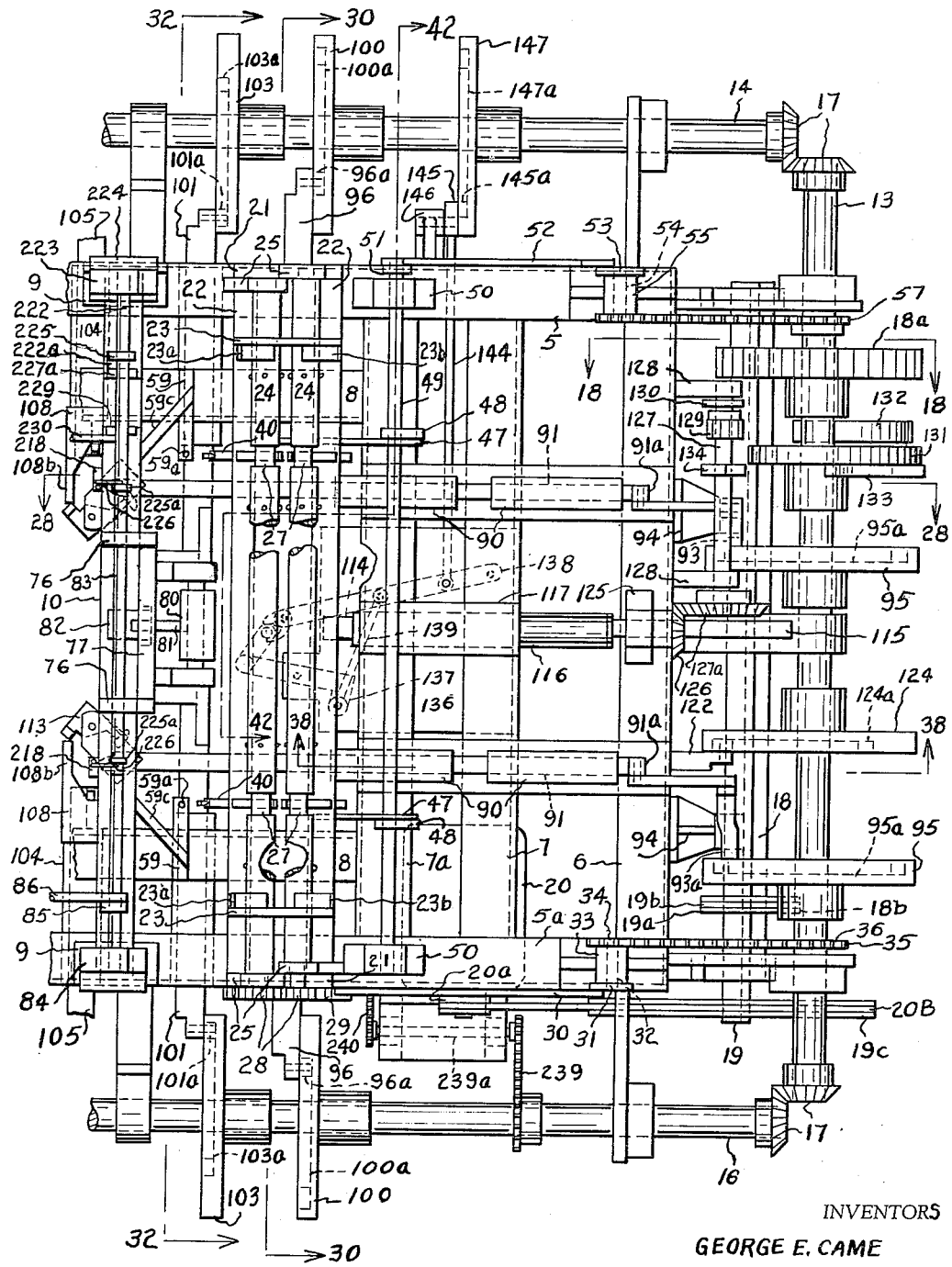
FIGS. 9 and 10 are top plan views, respectively showing the front and rear portions of the machine.

FIG. 42 is a fragmentary vertical section on 42—42 of FIG. 9, showing mechanism for forming a hook on the doubled shank.

FIG. 43 is a top plan view of said hook-forming mechanism.

FIG. 44 is a perspective view of the bend-forming element of the mechanism appearing in FIGS. 42 and 43.

FIG. 45 is a fragmentary vertical section on the line 45—45 of FIG. 16 and showing in its forward position a carriage slidable longitudinally of the machine for delivering struts to their position of assembly with wire members.

FIG. 46 is a fragmentary plan view of a lateral portion of the strut carriage, showing one of the paired wire clinching mechanisms mounted on the carriage, and showing the relation of such mechanism to relatively fixed control parts, when the carriage is at its rear limit of travel.

FIG. 47 is a similar view showing said relation when the carriage is at its forward travel limit.

FIG. 48 is a vertical sectional view, taken on the line 48—48 of FIG. 46.

FIG. 48A is a vertical sectional view taken on the line 48A—48A of FIG. 47.

FIG. 48B is a fragmentary vertical section taken on the line 48B—48B of FIG. 15.

Figure 10:
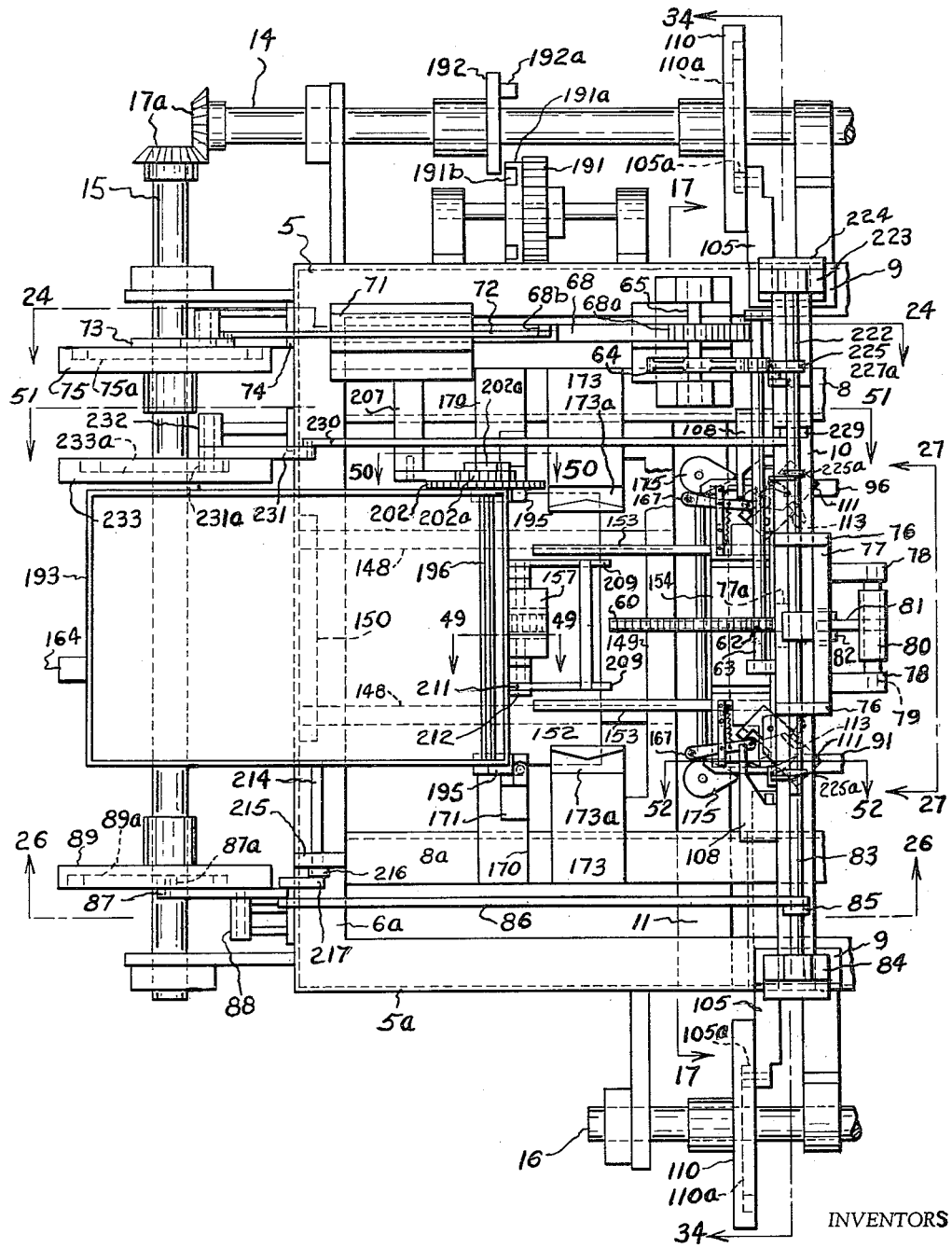
Figure 11:
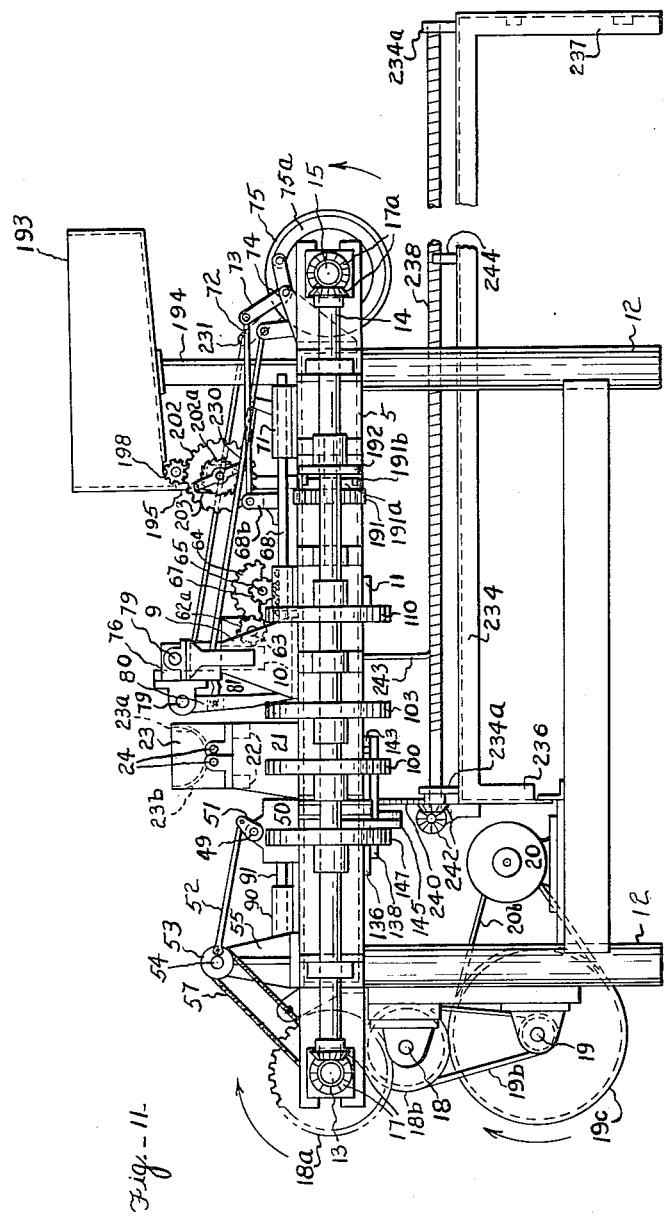
FIGS. 11 and 12 are opposite views of the machine in side elevation.

FIGS. 49 and 50 are fragmentary vertical sectional views taken on the lines 49—49 and 50—50 of FIG. 10, and showing mechanism for downwardly feeding struts from a hopper and delivering them singly to a reciprocatory carriage.

FIGS. 51 and 52 are fragmentary vertical sections taken on the lines 51—51 and 52—52 of FIG. 10 and showing a mechanism for downwardly ejecting completed hangers.

FIG. 53 is a top plan view partially in section of the rear portion of the machine, showing certain of the mechanisms modified to connect wire members and struts in accordance with FIG. 8.

FIG. 54 is a fragmentary vertical section on the line 54—54 of FIG. 53 and showing how a strut is yieldably retained on the carriage, as modified.

FIG. 55 is a fragmentary vertical section taken on 55—55 of FIG. 53 and showing one of the paired end-forming mechanisms employed in the modified machine.

FIG. 56 is a vertical section taken on the line 56—56 of FIG. 55.

FIG. 57 is a horizontal section taken on the line 57—57 of FIG. 55.

The Product of the Machine

With particular reference to FIGS. 1–7, the purpose of the machine is to insert and secure tubular struts 1 between the ends of the downwardly divergent arms of wire hanger members 2, formed by the machine from suitable blanks 2a immediately prior to such insertion. Each wire member comprises the usual shank 3 integrally upstanding from the juncture of the arms and forming a supporting hook 4. The struts are of a length to interconnect the free ends of the wire arms. The term "yoke" is hereinafter applied to the hanger portion comprised by the divergent arms.

Frame of the Machine

The frame comprises a pair of horizontally spaced parallel channel side beams 5 and 5a, rigidly interconnected at their ends by front and rear channel beams 6 and 6a, and having their front portions spanned by spaced parallel angle beams 7 and 7a. Longitudinally of the frame, a pair of angle beams 8 and 8a extend respectively in parallel proximity to the respective side members, from the angle beam 7a to the rear beam 6a. Brackets 9, oppositely surmounting the mid portions of the side beams, support and suitably elevate a rectangular cross-beam 10, and slightly rearward from such across-beam, there is fixed to and beneath the side beams a lower cross-bar 11. Legs 12 support the frame at a desired height.

Drive to Main Cam Shafts (FIGS. 18 and 9)

Journaled upon and outwardly from the frame at its front and rear are parallel cam shafts 13 and 15, and cam shafts 14 and 16 similarly extend upon and at opposite sides of the frame. Pairs of bevel gears 17 drive the shafts 14 and 16 from the shaft 13, and the shaft 15 is driven through bevel gears 17a from the shaft 14. The shaft 13 is driven through gears 18a from a countershaft 18 which is in turn driven from a countershaft 19 through a belt 19b engaging pulleys 18b and 19a. A motor 20 below the frame drives the shaft 19 through a belt 20b engaging pulleys 19c and 20a.

Hopper for Wire Blanks (FIGS. 19–23)

In a forward relation to the cross-bar 10, a pair of opposed vertical plates 21 are oppositely fixed on the beams 5 and 5a, and are rigidly joined at their upper ends by a pair of spaced, parallel bars 22. The wire-receiving hopper, surmounting said bars comprises end walls 23 each having a pair of spaced downwardly convergent seats 23a and 23b, such seats engaging only the ends of the blanks and having a gap 23c between their lower ends through which the blanks are delivered downwardly between a pair of rollers 24. Such rollers extend through the end walls to be journaled in bearings 25, and are so spaced as to pass only one blank at a time, being further equipped at intervals on their circumferences with spring-loaded balls 26. Rapid rotary oscillation of the rollers forces the wire blanks between them, said balls agitating the blanks to prevent jamming. Such oscillation is applied (FIG. 12) by pinions 28 driven by a rack bar 29, reciprocated by connection through a rod 30 with a crank disk 31 on a shaft 32 journaled in bracket 33 and having a sprocket 34 driven by a chain 35 from a sprocket 36 on the shaft 13.

Longitudinally spaced annular grooves 27 are formed in each roller, and are oppositely positioned on the two rollers. Pairs of brackets 38 fixed on the bars 22 mount pairs of upright guide fingers 39 which project upwardly between the rollers in the spaces afforded by said grooves. The fingers of each pair are spaced to form a slot 39b of a width only slightly exceeding the thickness of the blanks, with a consequent "stacking" of blanks in said slots, and a resultant individual delivery thereof to the hanger-forming mechanisms. The bottom ends of the guide fingers engage and conform to the arcuate faces of a wire selecting device now to be described.

Wire Selectors (FIGS. 19–22)

There are provided two similar wire selectors each comprising a vertical plate 40 transverse to and beneath the hopper and formed with an arcuate upper edge. Formed in each such edge at its rear end is a vertical notch 40a intersecting a horizontal groove 40b in said arcuate edge which groove is proportioned to receive a single blank. Said notch receives the knife-edge of a wire-gripping latch 41 pivotally mounted on and between ears 42 oppositely fixed on the plate 40, and yieldably urged into said notch by a coil spring 43.

Each selector plate 40 is rigidly carried by a downwardly extending arm 44 pivoted at the axis of the arcuate edge of said plate on a block 45 surmounting a plate 46 fixed between elongated bearings 97 mounted in the frame members 5, 5a and 8, 8a. A swinging link 47 joins each arm 44 to a rocker arm 48 on a rock shaft 49 journaled above and transversely to the frame in bearings 50. Projecting through the bearing on the channel beam 5, said rock shaft terminally carries an arm 51 driven through a connecting rod 52 from a crank disk 53 on a shaft 54 journaled at 55. Said rock-shaft is driven through a sprocket chain 57 from the cam shaft 13.

Such arrangement oscillates the selector plates 40 in unison once during each revolution of the cam shaft 13. Such action raises the rearward ends of the plates and trips open the latches 41 as they encounter the guide fingers 39, bringing the grooves 40b beneath the slots 39b to receive a wire blank. As the rearward travel frees the latches, they snap into the notches 40a to secure the blank in said grooves during such travel.

A pair of elongated aligned bars 59 are fixed on and transversely to the frame, each having at its inner end an upwardly projecting stop screw 59a, and each such bar further rigidly mounts a horizontally elongated wire rest 59c. At the limit of their rearward travel, the latches 41 are tripped open by the stop-screws 59a, depositing a wire blank on the rests 59c.

Center Rack and Its Drive

A gear rack 60 is reciprocable longitudinally of the frame in guides 61 fixed centrally on and beneath the cross-bar 10 (FIGS. 24 and 25), and has a downwardly projecting, knife-edged spur 60b at its forward end. Driving such rack is a pinion 62 on a rock shaft 63 journaled on the cross-bar 10. Spaced outwardly on said shaft from said pinion is another pinion 62a, driven by a segmental gear 64 on a relatively short shaft 65 journaled on the frame of the machine. Adjacent said segmental gear, the shaft 65 mounts a pinion 67 driven by a gear rack 68a terminally carried by a bar 68 slidable in bearings 70, 71 on the frame. A bracket 68b, rigidly surmounting said slide bar actuates the latter through a connecting rod 72 from an arm of a bell crank 73 (FIG. 15). Said crank is pivoted on a bracket 74 and journals on its other arm a roller 74a received by a cam groove 75a in a disk 75 on the rear cam shaft 15. Such groove is designed to oscillate said bell crank once during each revolution of the shaft 15, thus reciprocating the rack 60 forward and back by the described transmission. As the rack is propelled forward, its spur 60b encounters the center of a wire blank 2a at the moment such blank is released by the latches 41, and with the cooperation of other elements as hereinafter explained, thrusts said center forward, doubling the mid-portion of the blank to form the shank 3 of a garment hanger.

Mechanism for Forming Paired Shoulders (FIGS. 26, 27, 10, 17)

Rigidly surmounting the cross-bar 10, a pair of spaced vertical plates 76 are interconnected by a plate 77. Journaled in bearings 78 on the latter plate, is the shaft 79 of the shoulder former 80, pivotally actuated through a link 81 from a clevis 82 (FIG. 16). The clevis is fixed on a shaft 83 having its inner end portion journaled in the plates 76 and its outer extremity journaled in a bracket 84, and mounting near such bracket a crank arm 85. A connecting rod 86 drives such arm from one end of a bell crank 87 pivoted on a bracket 88 and mounting on its other end a roller 87a engaged in a cam groove 89a of a disk 89 on the shaft 15. The groove 89a is designed to rock the shoulder former forward and back once during each revolution of the shaft 15. The lower end of the shoulder former 80 is vertically notched to allow passage of the rack 60, the legs created by the notch serving as wide-forming posts 80a and being suitably contoured for such function. (FIGS. 1–7.)

First Wire End Formers (FIGS. 28 and 29)

At the front of the frame, the first wire end formers reciprocate longitudinally of the machine in spaced bearings 90. Each of such formers comprises an elongated slide bar 91, having its rear end shaped and grooved horizontally as at 91b, to form the wire as desired. Rigidly upstanding from the forward ends of the slide bars are lugs 91a pivotally engaged by swinging links through which a drive is imparted from levers 93 and 93a respectively. Said levers are pivotally mounted in brackets 94, and similarly carry rollers 93b engaged in cam grooves 95a in duplicate disks 95 on the shaft 13.

The form of said levers differs (see FIG. 29) only to accommodate each to its spaced relationship with the corresponding cam disk. Once per revolution of the shaft 13, the described formers are thrust rearwardly to engage the wire end portions in the grooves 91b and against forming posts 112, more fully described hereinafter, bending the wire to a desired curvature.

Shank Doubling Vise (FIGS. 30 and 31)

The shank doubling vise comprises a pair of aligned slide bars 96 mounted forwardly of the cross-beam 10 in bearings 97 each jointly carried by beams 5 and 8 or 5' and 8'. Each bar 96 carries at its inner end a substantially vertical plate 98 surmounted by a horizontally elongated vise jaw 99 formed with a horizontal groove 99a across its inner end. The outer ends of the slide bars mount rollers 96a engaged in cam grooves 100a in duplicate disks 100 on shafts 14 and 16 respectively, and designed to advance and retract said vise jaws once during each cycle of the machine. The vise jaws take effect on the shank-forming lengths of wire near their juncture.

Additional Mechanism for Forming Paired Shoulders (FIGS. 32 and 33)

Spaced rearwardly of the shank doubling vise, and mounted in duplicate bearings 97 at opposite sides of the frame, are the aligned slide rods 101 of the yoke-forming tools. Rigidly fixed on the inner ends of such rods are a pair of upstanding plates 101b surmounted by oppositely identical forming tools 102 having inwardly projecting vice jaws 102a horizontally grooved at 102b. Said forming tools have their opposed inner corners rounded and horizontally grooved at 102c. Said vise jaws 102a close upon and securely grip the doubled shank wire in grooves 102b; the aforesaid rounded corners also engage said wire in grooves 102c to form the shoulders of the hanger yoke. At their outer ends the slide rods 101 mount rollers 101a received by cam grooves 103a in duplicate disks 103 on the shafts 14 and 16, and are thus reciprocated to and from each other once during each revolution of said shafts.

Second Wire End Formers (FIGS. 34–36)

Spaced rearwardly of the paired shoulder forming tools and mounted similarly to the bearings 97 are horizontally elongated bearings 104 receiving a pair of aligned slide rods 105 each rigidly mounting at its inner end a vertical plate 106. Each such plate mounts on its upper portion a forming tool 107 effective on the corresponding end portion of the partially formed hanger wire and having a horizontal groove 107a to receive such portion. A roller 105a mounted on the outer end of each rod 105 engages in a cam groove 110a of a disk 110 duplicated on the cam shafts 14 or 16, whereby the above-described tools are actuated once during each revolution of said disks, their function being hereinafter described in detail.

Third Wire End Formers (FIGS. 36 and 37)

Rigidly surmounting the plates 106 and overlying the tools 107 are elements 108 having inwardly elongated fingers 108b for actuating the third end formers in coaction with the second end formers. Fixed to and beneath the cross-bar 10 is a pair of tool mounting plates 111 spaced lengthwise of such bar and rigidly mounting downwardly extending forming posts 112 having grooves 112a. Pivoted upon and beneath each plate 111 is a third end-forming tool 113 having a projecting wire-engaging end 113a horizontally grooved at 113b. Suitable upward projections 113c on the tools 113 are engaged by the fingers 108b as the second end-forming tools move in, such fingers pivoting said tools so that the wire-engaging projections 113a take effect on the wire ends. The second and third end formers conjoin to form the wire member with terminal parallel portions for piercing a strut.

Shank Twisting Mechanism (FIGS. 38–41)

The desired twist is applied to the shank 3 by a mechanism comprising a chuck 114 having in its end face a slot 114a to receive the doubled wire of the shank. Said mechanism further comprises a shaft 115 terminally rigidly mounting the chuck and rotatable in an elongated sleeve 116 nonrotatably slidable in a bearing 117 and formed with rack teeth 116a on its under side. The bottom wall of said bearing is cut away at its mid portion to allow the rack teeth to engage a gear 118 fixed on a shaft 119 journaled in a pair of brackets 120. Spaced on said shaft from said gear, a pinion 121 meshes with rack teeth 122a formed on a slide bar 122, mounted in a bearing 123. Said slide bar terminally carries a roller 122a received by a cam groove 124a of a disk 124 on the shaft 13. Thus, once during each revolution of said cam shaft, the slide bar 122 is reciprocated to actuate the gearing above described which thrusts the chuck 114 into engagement with said shank 3, and subsequently retracts said chuck.

The aforesaid shaft 115 is slidably journaled in a bearing 125 which further maintains the engagement of a bevel gear 126, slidably keyed on said shaft, with a bevel gear 127a terminally fixed on a shaft 127 journaled transversely to the shaft 115 in brackets 128. Rigidly mounted on the shaft 127 is a pinion 129 having a shroud 130, the latter having a starting tooth 130a extending across and outwardly adjacent to the pinion teeth. A disk 131 fixed on the cam shaft 13, bears a segmental gear 132 (FIG. 40) so mounted on one side of said disk as to have the same axis as said disk and having teeth which project outwardly beyond the disk to engage and rotate the pinion 129, which results, through said bevel gears, in a rotation of the chuck 114, when disposed at its rear limit of reciprocation. The starting tooth takes the initial shock of each impact between the segment and pinion.

As it is highly desirable for hook-forming purposes, to have the doubled wires of the shank in a plane transverse to the wire hanger body, the slot 114a, after each twisting operation, is left in such plane, which is of course transverse to the plane in which said slot must receive said shank portion preliminary to twisting. To properly reposition said slot horizontally for twisting purposes, the shaft 127 mounts a cam 134 engageable by a cam 133 mounted on the disk 131 (FIG. 41) at the side thereof opposite the segmental gear 132 and angularly positioned to lead such gear. As the disk 131 revolves, the cam 133 contacts and rocks the cam 134 causing it to rock the shaft 127 and consequently the chuck 114, the degree of rotation being such as to correctly position said slot to receive the shank.

Hook Formers (FIGS. 42–44)

Fixed to and beneath the angle beams 7 and 7a, is a horizontal plate 136 pivotally supporting thereunder the horizontally swinging arms 137 and 138, which are interconnected by a link 139 (FIG. 43). Rigidly surmounting the rear end of the arm 137 is a post 140 mounting on its upper end a laterally projecting lug 141 carrying a downwardly projecting hook-forming boss 142, and terminating angularly to form a cam at 141a adjoining such boss.

Rigidly upstanding from the rear end of the arm 138, another post 143 has vertically pivoted on its upper end a collar 143a having a curved hook-forming finger 143b and a cam projection 143c. A connecting rod 144 joins the arm 138 to the lower end of a lever 145 pivoted at its mid-portion on a bracket 146. A roller 145a on the upper end of said lever engages in a cam groove 147a of a disk 147 on the cam shaft 14, whereby said lever is oscillated once during each revolution of said disk.

The effect of such oscillation is to draw the posts 140 and 143 toward each other, so that the cam 141a bears upon the projection 143c thus rocking the collar 143a and causing the finger 143b to embrace the boss 142, bending the wire about such boss to hook form. When said projection 143c is freed from the cam 141a, a spring 143d repositions such collar for the next cycle.

Carriage and Its Drive Mechanism (FIGS. 15, 45)

The carriage slides forward and back upon a pair of spaced parallel guide rods 148 fixed at their ends in brackets 149 and 150. A pair of spaced elongated end members 151 bridged by a platform 152 are slidably mounted on said guide rods transversely thereto, and a pair of spaced parallel bars 153, secured to and extending forwardly from said platform, bear across their front ends a horizontally elongated strut-receiving plate 154. Centrally surmounting said platform is a gear rack 155 utilized as hereinafter explained.

A pair of spaced parallel supporting bars 156 are forwardly elongated from the rear frame member 6a, thus overhanging the described carriage. Bridging the forward ends of such bars is a plate 157 having fixed to its bottom surface, between said bars, a gear rack 158 parallel with and spaced above the rack 155. The spacing of such racks accommodates a pinion 159 journaled in a yoke 160 fixed on a connecting rod 161 actuable by a lever 162 pivoted at its lower end on a bracket 163. A roller 163a carried by the mid-portion of said rocker arm engages in a cam groove 164a in a disk 164 on the cam shaft 15. Such arrangement actuates said lever back and forth responsive to each revolution of the cam shaft, reciprocating the gear 159 which, rotating along the fixed rack 158, impels the rack 155 and carriage.

Wire Clinching Mechanisms on Carriage (FIGS. 46–48B)

The strut-receiving plate 154 extends equally to opposite sides of the bars 153, and mounted on such extensions are duplicate mechanisms for centering a tubular strut 2 relative to said carriage, retaining such strut during forward travel of the carriage, and securing the ends of a hanger wire to the strut extremities (FIG. 7). Said mechanisms are assembled in shallow pockets 165, formed in said end portions, from which grooves 165a extend longitudinally of the plate. Occupying the rearward portion of each groove is an elongated bar 166 having a projecting end portion overhanging said pocket. A lever 167 is pivoted at 167a within each pocket beneath said bar 166, while a pivot at 168a similarly mounts a lever 168 having a tapered pin 168d laterally projecting from its forward end.

Upon and beneath the rear end of the lever 167 is journaled a roller 167b, and the front end portion of such lever is slotted as at 167c to receive a wire-clinching die 169, pivoted therein through slot 169b and further pivoted at 169c in a horizontal slit 165b in the front wall of said pocket. Said clinching die has a convex cam edge 169a and another edge portion concavely curved and grooved as at 169d to engage the wire.

A cam edge 168b is cut at an angle to the rear end of the lever 168, which has its mid portion formed at 168c with a second cam portion.

A pair of elongated plates 170 are oppositely fixed on the beams 8 and 8a in close rearward and downward proximity to the strut-receiving plate 154 (when the carriage is retracted) and each mounts a bracket 171 including a lug 171a upon and beneath which is journaled a roller 172. Forwardly adjacent and parallel to each plate 170 is an elongated cam plate 173, its inner portion closely underlying the adjacent pocket-forming extension of the plate 154, and having a cam groove 173a in its upper surface.

As the carriage is fully retracted, as per FIG. 46, the cam edges 168b engage the rollers 172, rocking the levers 168 so that the pins 168d are swung outwardly, allowing a strut to be brought horizontally against the front edge of the plate 154 by a strut pick-up mechanism hereinafter described. Forward travel of the carriage releases the strut from the pick-up mechanism while simultaneously freeing said cam edges from said rollers. A coil spring 174 pivots the forward end of each lever 167 inwardly, causing the rear portion thereof to bear outwardly against the rear corner of the corresponding lever 168 and pivot such lever in turn, thus forcing the pins 168d partially into the strut ends.

Continued forward movement of the carriage draws the rollers 167b through the cam grooves 173a, forcing the roller-mounting ends of the levers 167 further outward and consequently further pivoting the levers 168 to force said tapered pins completely into the strut, centering the latter relative to the carriage, and rearwardly drawing said strut firmly into a shallow groove 154a coextensive with the front edge of the plate 154. When the rollers 167b clear the cam grooves 173a, the springs 174 maintain said levers in the positions established by said grooves preparatory to the final clinching operation.

As the carriage reaches its limiting forward position, the strut ends are diametrically pierced by the ends of the wire member, the latter ends extending horizontally, transverse to the strut, and such piercing occurring in close inward proximity to the inserted pins 168d, which support the strut against collapse. The wire ends project rearwardly beyond the pierced strut to engage the clinching dies and are outwardly curved conformingly. The rollers 167b are now in contact with a pair of driven cams 175, the rotation of which forces said rollers inwardly, rocking the actuating arms 167 which in turn rock the clinching dies on their pivots 169c forcing their grooved edges 169d forward to clinch the wire ends lightly into the strut, and concurrently engaging the aforesaid cam edges 169a against the cam edges 168c to force the front ends of the levers 168 outward and thus withdraw the pins 168d from the strut extremities.

*Clincher Cam Operating Mechanisms (FIGS. 15, 17, 48B)*

The aforesaid twin cams 175 are fixed on the upper ends of shafts 176 journaled in blocks 177 supported on uprights 178 fixed to the lower cross-bar 11. Said shafts are driven through bevel gears 179 from a shaft 181 journaled horizontally beneath the shafts 176 in the uprights 178. The shaft 181 projects through the angle beam 8 and is driven through a pair of bevel gears 183 from a horizontal shaft 185, journaled at 182a and 186 transversely to shaft 181. Rearwardly spaced from the bearing 182a, the shaft 185 carries a gear 187 driven through a gear train 188, 189, 190, and 191 (FIG. 48B). The gear 191 is rearwardly faced with a Geneva wheel 191a having four equally spaced slots 191b. A disk 192 on the cam shaft 14 bears a roller 192a so situated thereon as to successively enter said slots during successive revolutions of said disk, actuating said Geneva wheel a quarter turn for each revolution of the shaft. The ratio of above-mentioned gear train is such that a complete revolution of the cams 175 is effected by each quarter turn of the Geneva wheel.

*Strut Hopper (FIGS. 49, 50)*

The strut hopper comprises a rectangular open-topped receptacle 193 of a width slightly exceeding the strut length. The bottom of such receptacle slants downwardly toward its front wall, there being, however, a slot-like outlet between said wall and the forward edge of said bottom. Said receptacle is primarily supported by an upright 194, while its forward corners surmount a pair of legs 195 upstanding from the inner extremities of the plates 170. A downwardly elongated groove 195a is formed in the upper portion of each leg 195, such grooves being opposed on the two legs and terminating in forwardly directed outlets 195b. An elongated, longitudinally fluted strut agitator 196 extends between and is journaled in blocks 197 rearwardly fixed on the upper portions of the legs 195. Said agitator underlies and closes the rear portion of the elongated hopper outlet, leaving sufficient space only for the struts to pass singly down into the grooves 195a. An upward and rearward rotation of the agitator through the outlet prevents the accumulated struts above it from clogging said outlet. Projecting beyond one of the bearing blocks 197, said agitator terminally mounts a pinion 198 driven as explained below.

Spaced downwardly from said agitator and journaled in blocks 199 on the rear faces of the legs 195 is a shaft 200 mounting a pair of sprocket-like strut selectors 201 between and adjoining the legs. Said selectors engage the struts singly and successively, forcing them down into a pick-up device hereinafter described.

A gear 202, faced with a ratchet wheel 202a, is fixed on a projecting end of said shaft 200 and drives the aforementioned pinion 198. Pivotal on said shaft and outwardly adjacent to said ratchet wheel is a lever 203 pivotally mounting at its upper end a pawl 204 engaging the ratchet wheel. The lower end of said lever is connected by a link 205 to the upper arm of a bell-crank 206 pivoted on a block 207. A roller 206a journaled on the lower arm of said bell-crank is disposed to be contacted and raised by the inclined surface of a cam 152a fixed on and adjoining one side of the carriage platform 152. As the carriage completes retraction, said cam thus actuates the bell crank 206 which rocks the lever 203 causing the pawl to advance the ratchet wheel and gear. Thus the selectors deliver a strut into the pick-up device and engage the next consecutive strut for the subsequent cycle, while engaging gears 198 and 202 rotate said agitator 196.

*Strut Pick-Up Mechanism (FIGS. 49 and 50)*

The forward portions of the aforesaid horizontally elongated bars 156 mount a pair of horizontally aligned outwardly projecting pivot pins 208, which mount a pair of duplicate strut pick-up rocker arms 209, joined by a strap 209c to assure unitary rocking thereof. Described in their vertical position as shown in FIG. 49, each arm 209 is formed with a notch 209a in its upper end to receive a strut which is retained therein by a flat, elongated spring 210 fixed on the arm. A lug 211 on one of said pick-up arms is joined by a link 212 to a rocker arm 213 (FIG. 26) terminally mounted on a rock shaft 214 journaled in brackets 215. On its opposite end, the shaft 214 mounts an arm 216 actuable through a connecting rod 217 from the bell crank 87. In their horizontal positions the pick-up arms recline in grooves 154b in the strut receiving plate 154 when the carriage is at its rear limit.

*Ejector Mechanism (FIGS. 51, 52, 17)*

Blocks 218 on the rear face of the cross-bar 10 receive a pair of vertical plungers 219 mounting vertical ejector members 220 in sliding contact with the rear face of said cross-bar. The aforesaid elements are so disposed that a downward thrust of said ejector members releases the ends of the completed hangers from a slight binding retention on the forming posts 112. Preferably the ejector members take effect on the strut end portions of a finished hanger.

A rock shaft 222 has one end journaled in a bearing block 223 surmounting a bracket 224 fixed on the cross-beam 10. The opposite end portion of said shaft journals in and extends beyond the paired vertical plates 76 on said cross-beam. Rigidly mounted on said shaft, a pair of spaced rocker arms 225a are joined by links 226 to the upper ends of the plungers 219. A relatively short shaft, journaled in a bracket 228 surmounting said cross-beam, terminally mounts an arm 227a acting through a link 222a to actuate an arm 225 carried by the shaft 222. The opposite end of the shaft 227 mounts an arm 229 from which a connecting rod 230 leads to a rocker arm 231 pivoted at its lower end on a bracket 232. On its mid portion, said arm 231 mounts a roller 231a received in a cam groove 233a of a disk 233 on the cam shaft 15, such groove being designed to effect a rapid periodic reciprocation of the plungers 219 and associated ejector elements 220.

*Conveyor Mechanism for Completed Hangers (FIGS. 9, 12, 13, 14, 17)*

Longitudinally underlying the frame is a pair of spaced angle beams 234 which project considerably rearward beyond the frame and have their corresponding ends rigidly interconnected by cross-bars 235. Pairs of uprights 236 carry said beams beneath the machine, and a pair of legs 237 mount their rear ends. Brackets 234a fixed on the bars 235 journal a pair of parallel spirally grooved conveyor shafts 238 serving jointly to deliver finished hangers rearwardly from the machine.

Figure 12:
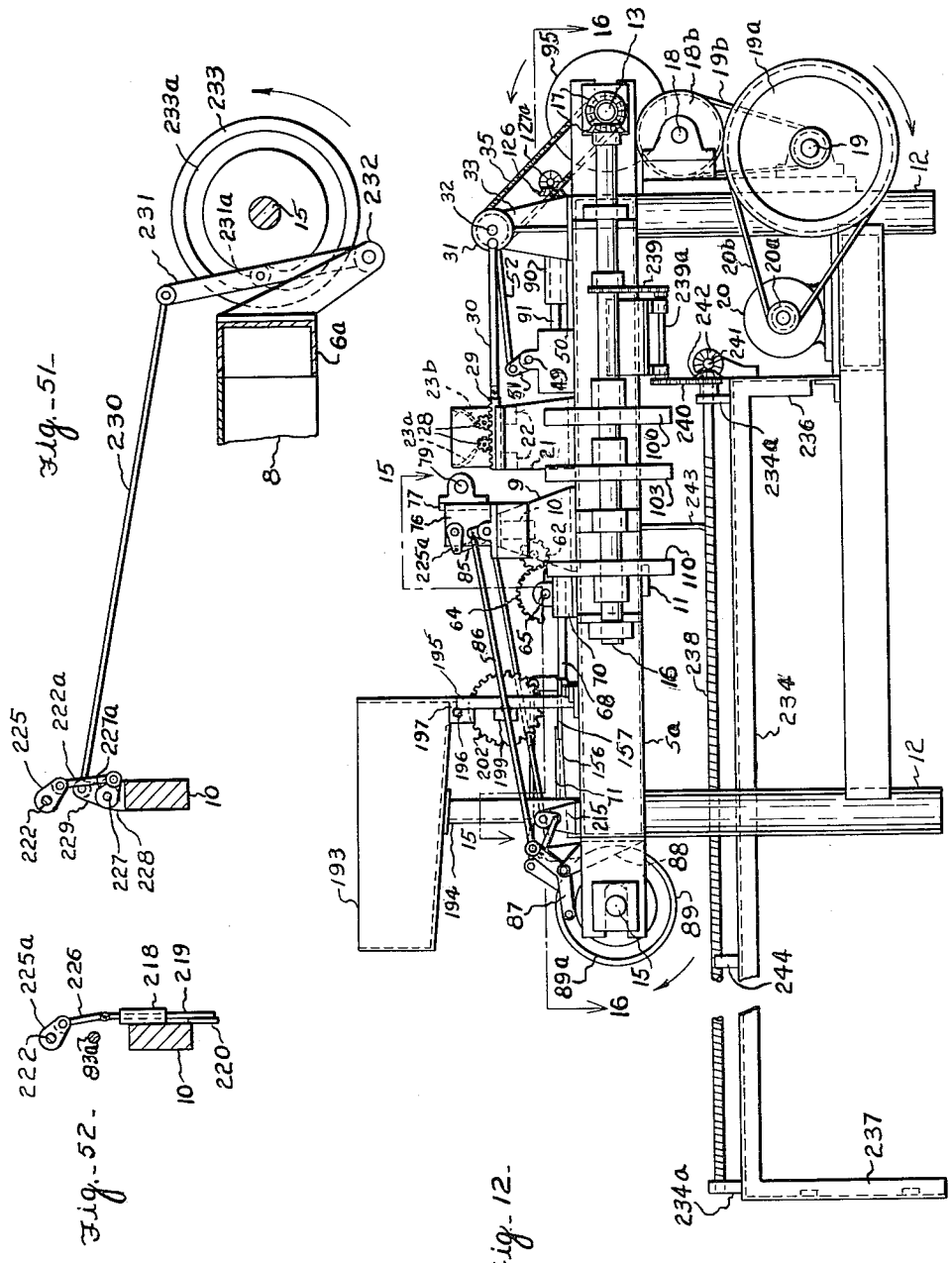
Figure 13:
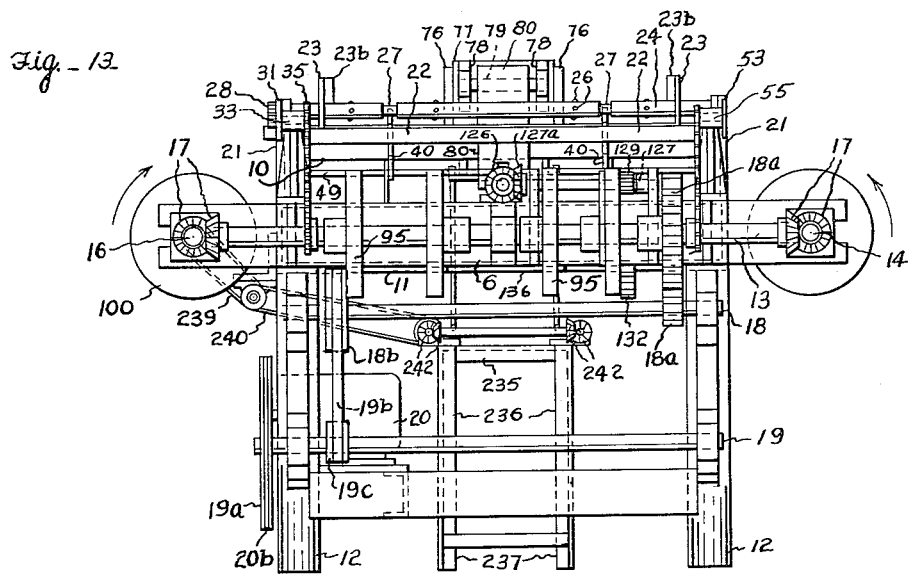
FIG. 13 is a view of the machine in front elevation.
Figure 14:
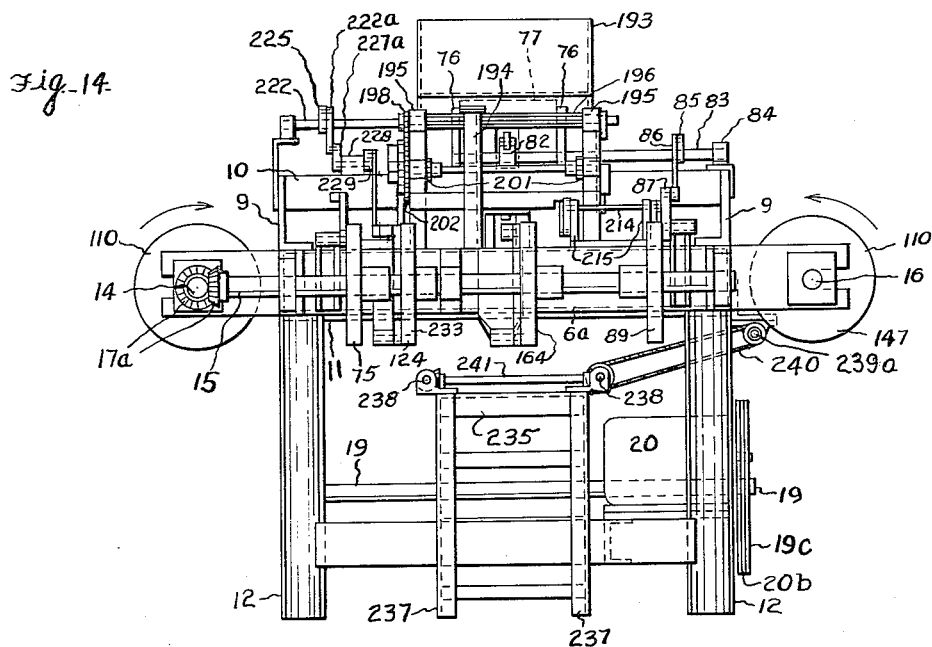
FIG. 14 is a rear elevational view.

A drive to said conveyor shafts from the shaft 16 is established, as best appears in FIG. 12, through a sprocket chain 239 to a counter shaft 239a, from the latter to one of the conveyor shafts through a sprocket chain 240, and to the other conveyor shaft through a cross shaft 241 and bevel gearing 242.

The aforesaid drive maintains constant corresponding rotation of the shafts 238 while the machine is in operation. L shaped guide rods 243 assure the proper inverted positioning (FIG. 17) of completed hangers as they are downwardly delivered to the two conveyor shafts. Partial bearings 244 fixed on said angle beams 234 underlie the shafts 238 sufficiently to provide support without hampering the rearward travel of the hangers.

*Modification (FIGS. 53–57)*

FIG. 53 is similar to FIG. 15, but illustrates a modification suited to interconnect a wire member and strut as per FIG. 8. Such modification employs a pair of duplicate strut centering levers 245, pivotally mounted at 245b on a strut-receiving plate 247 of the carriage, each having a cam edge 245a on its rear end portion, and such cam edges engaging the rollers 172 when the carriage is retracted, and such engagement outwardly pivoting the forward ends of the levers against the tension of coiled springs 246. Struts are periodically delivered to the retracted carriage from the strut hopper by the mechanism hereinbefore described, being forced between the front edge of the plate 247 and a pair of gripping fingers 248 (FIG. 54). Such fingers are pivoted upon projections 247b beneath said plate, and securely hold the strut in a groove 247c coextensive with the front edge of the plate. A pair of springs 249 effect and maintain engagement of the fingers with the strut. As the carriage moves forward, the levers 245 disengage said rollers, and their front ends close upon the strut.

The aforementioned third wire end formers are eliminated in the modified machine, and only the forming posts 112' are retained on the plates 111'. A pair of substantially vertical plates 250 project rigidly upward from aligned side bars 105' (FIG. 55) and each is surmounted by a substantially cylindrical forming tool 250a (FIG. 57) having a horizontal wire-receiving groove 250b. The first end formers having previously partially formed the ends of the hanger wire (FIG. 3), which project at a divergent rearward angle, the carriage moves forward, positioning the strut between said wire ends. The second end forming tools move in, engaging the projecting wire ends in the grooves 250b and forming such ends with U bends (FIG. 57) by thrusting them into the strut ends. The forward ends of the centering levers 245 absorb the initial resistance of the wire to the forming operation while the front edge of the plate 247 bolsters the rearward wall of the strut against tearing or distortion as the tip of the wire is drawn along the inner face of the strut. With the strut thus engaging the wire, the gripping fingers 248 are sprung free of the strut as the carriage retracts. After the second end formers retract, the aforesaid ejectors impel the completed hanger downwardly.

In avoiding piercing and clinching operations, the modified machine eliminates the opposed plates 173 with their cam grooves, also the clinching dies 169 and cams 175 for actuating such dies, and also, of course, the drive mechanism for said cams.

*Operation of the Machine*

The operating cycle begins as the wire selector plates 40 jointly receive a wire blank 2a and deliver it rearwardly. During such delivery the strut pick-up arms 209 are swung to their vertical position to receive a strut, and the carriage approaches its rear limit. The center rack 60 moves forward, its spur 60b engaging the center of the wire blank as such blank is released and carrying such center forward (FIG. 1). The divergent arms thus formed are engaged in and supported by the horizontal grooves 99a and 102b in the shank vise jaws 99 and in the jaws 102a on the shoulder-forming mechanisms (FIG. 2). Said vise jaws double the wire, upon which they close securely as the spur 60b retracts from between them (FIG. 3).

At this point the strut pick-up mechanism has delivered a strut to the forward edge of the carriage plate 154, as best appears in FIG. 49, and the coacting linkage 86, 85, 82, 81, has positioned the shoulder-forming posts 80a. The outer shoulder formers 102 are moving in; the vise jaws 102a grip the wire immediately after the spur 90b withdraws from between them (FIG. 3), the forming tools simultaneously closing upon said posts 80a. The first end formers 91 have closed upon the forming posts 112, bending the wire to conform thereto.

The shank vise jaws 99 open to allow the chuck 114 to move rearwardly (FIG. 4), receive, and twist (FIGS. 5 and 6) the double shank wire, and retract. During the twisting operation, the second end formers are actuated (FIGS. 4 and 5), bending the wire ends inwardly toward each other, and actuating the third end formers which direct the wire end portions rearwardly to impale a strut as the carriage brings it forward (FIG. 6). As the carriage receives its initial forward actuation, the rear ends of the levers 168 are released from the rollers 172, and the pins 168d are thrust by said levers partially into the strut extremities. Thus, said pins maintain the strut properly engaged with the plate 154 as the carriage moves forward. The wire members are in their assembly-forming position when they have been formed with rearwardly directed end portions, as in FIG. 5, so that a strut, in completing its forward advance, may be impaled upon such portions.

The second end formers retract (FIG. 6) before the strut engages said wire ends, to allow said strut to pivot the third end formers clear of the wire by striking the forming element 113a. The cams 175 then operate the described clinching mechanism which outwardly bends the projecting wire ends against the strut (FIG. 7). While the clinching operation is in process, the hook-forming mechanism functions as the carriage retracts, said hook-forming device releases its grip and the ejectors impel the completed hanger downwardly to seat on the discharge shafts 238.

Since the several main cam shafts are driven in unison and at the same speed, and each revolution thereof produces a complete hanger, it is feasible to establish a required cyclic relation between the various mechanisms, accurately coordinating their performances.

What we claim is:

1. In a machine for making garment hangers of the type comprising a wire member having a pair of downwardly divergent arms, and a strut formed of relatively thick material bridged between and carried by the arm ends, the combination with mechanism for periodically and singly establishing such wire members in an assembly-forming position, of a hopper receiving a plurality of the struts, mechanism for discharging the struts singly from the hopper, a carriage receiving the struts singly from said discharge mechanism and delivering them periodically to said assembly-forming position, mechanism for securing the ends of the wire member to the strut ends, means for actuating the several specified mechanisms and the carriage in a predetermined cyclic relation, a pivotal arm receiving the struts singly from said discharge mechanism and delivering them to said carriage, and means for periodically actuating said arm in a cyclic relation to actuation of said mechanisms and carriage.

2. In a machine as set forth in claim 1, means on the carriage for engaging a strut delivered by the pivotal arm to release the strut from such arm and retain it on the carriage for delivery to the assembly-forming position.

3. In a machine as set forth in claim 1, the strut being tubular, a pair of pins on the carriage for insertion in the ends of the strut to retain the strut on the carriage during delivery to the assembly-forming position, and means for effecting such insertion responsive to an initial advance of the carriage toward such position.

4. In a machine as set forth in claim 1, a spring on said arm for yieldably retaining a strut on the arm during delivery of such strut to the carriage, and means on the carriage for latching to the carriage a strut delivered by the arm, and thereby releasing the strut from the arm upon initial advance of the carriage toward its assembly-forming position.

5. In a machine for making garment hangers of the type comprising a wire member having a pair of downwardly divergent arms, and a strut formed of relatively thick material bridged between and carried by the arm ends, the combination with mechanism for periodically and singly establishing such wire members in an assembly-forming position, of a hopper receiving a plurality of the struts, mechanism for discharging the struts singly from the hopper, a carriage receiving the struts singly from said discharge mechanism and delivering them periodically to said assembly-forming position, mechanism for securing the ends of the wire member to the strut ends, and means for actuating the several specified mechanisms and the carriage in a predetermined cyclic relation, said securing mechanism including means for forming the wire member with parallel ends for impaling a strut, a pair of clinching dies rotatably mounted on the carriage and engageable with portions of said parallel ends protruding from the impaled strut, mechanism for applying a concurrent clinching rotation to said dies, and means for cyclically actuating such securing mechanism substantially upon delivery of a strut to its assembly forming position.

6. In a machine for making garment hangers of the type comprising a wire member having a pair of downwardly divergent arms, and a strut formed of tubular material bridged between and carried by the arm ends, the combination with mechanism for periodically and singly establishing such wire members in an assembly-forming position, of mechanism for singly delivering the hanger struts to said position and disposing them between the ends of the wire members, and mechanism for imposing an approximate U form on such ends and thrusting such ends respectively into the respective strut ends, means for actuating said mechanisms in a predetermined cyclic relation, the last-mentioned mechanism including a pair of aligned slide rods, forming tools respectively carried by the respective rods and proportioned for insertion in the strut ends, means for periodically and simultaneously advancing said rods toward each other to force the ends of the wire member into the strut ends, and means engaging the strut ends during advance of said rods to relieve such ends of the stresses applied by the forming tools.

7. In a machine for making garment hangers of the type comprising a wire member having a pair of downwardly divergent arms, and an elongated strut formed of relatively thick material bridged between and carried by the arm ends, a hopper receiving a supply of the struts, means for guiding the struts in downward travel from such hopper, mechanism for periodically advancing the struts successively downwardly in said guide means, a carriage receiving the struts singly from said guide means and delivering them cyclically to an assembly-forming position, an actuating element mounted on the carriage for travel therewith and taking effect on said strut-advancing mechanism as the carriage approaches its strut-receiving position, means for actuating the carriage, a rocker arm having a strut-receiving free end, and having limiting pivotal positions in which it respectively receives a strut from said strut-advancing mechanism and delivers such strut to the carriage, and means for rocking said arm in timed relation to the carriage travel.

8. In a machine for making garment hangers of the type comprising a wire member having a pair of downwardly divergent arms and an elongated strut formed of relatively thick material bridged between and carried by the arm ends, a hopper receiving a supply of the struts, means for guiding the struts in downward travel from the hopper, mechanism for periodically advancing the struts successively downwardly in said guide means, a reciprocatory carriage receiving the struts singly from said guide means at one limit of carriage reciprocation and delivering them cyclically to an assembly-forming position substantially at the other limit of reciprocation, an element mounted on and reciprocable with the carriage for actuating the strut-advancing mechanism as the carriage approaches its strut-receiving limit of reciprocation, and means for effecting reciprocation of the carriage.

9. In a machine as set forth in claim 8, an agitator facilitating the discharge of struts from the hopper, and means for actuating the agitator from said element on the carriage in unison with said strut-advancing mechanism.

10. In a machine for making garment hangers of a type including wire members, a hopper for receiving a supply of rectilinear wire blanks for forming such members, such hopper having a downwardly opening elongated outlet, means for guiding the blanks sequentially downward from the outlet, a feed member pivoted downwardly from said guide means to rock transversely to said outlet, such member substantially throughout its rocking travel presenting to the guide means an edge arcuate about the pivot axis of the feed member and having such edge notched to receive a single blank, a latch on the feed member for retaining a blank in the notch, means for periodically rocking the feed member between definite limits to singly receive blanks in said notch substantially at one limit of said rocking, and means for automatically releasing the latch at the other limit of such rocking.

11. In a machine for making garment hangers of the type comprising a wire member having a pair of downwardly divergent arms and a supporting hook at the juncture of such arms, and a strut formed of relatively thick material bridged between and carried by the ends of such arms, the combination with a hopper for receiving substantially rectilinear blanks for forming said wire members, of mechanism for feeding said blanks singly from said hopper, mechanism for shaping the blanks successively to form their divergent arms and said supporting hook, a hopper receiving a supply of struts for forming the required hangers, mechanism for feeding the struts singly from the strut hopper, mechanism for establishing each strut in a bridging relation to the arms of a wire member, mechanism for securing the respective strut ends substantially rigidly to the respective arm ends in said relation, and means for actuating said mechanisms in a predetermined cyclic relation.

12. In a machine for making garment hangers of the type comprising a wire member having a pair of downwardly divergent arms, and a strut formed of tubular material bridged between and carried by the arm ends, the combination with mechanism for periodically and singly establishing such wire members in an assembly-forming position, of mechanism for singly delivering the hanger struts to said position and disposing them between the ends of the wire members, and mechanism for imposing an approximate U form on such ends and thrusting such ends respectively into the respective strut ends, and means for actuating said mechanisms in a predetermined cyclic relation.

13. In a machine for making garment hangers of the type comprising a wire member having a pair of downwardly divergent arms, a shank upwardly extending from the juncture of such arms, a supporting hook on the shank and a strut formed of relatively thick material bridged between and carried by the arm ends, the combination with mechanism for bending a rectilinear blank at its center to form the divergent arms, of mechanism for doubling the midportion of the blank to form a shank, mechanism for shaping the free end portion of the shank to form a hook, mechanism for delivering a strut between the ends of the arms, mechanism for securing the strut ends to the free ends of said arms, and means for actuating the several specified mechanisms in a predetermined cyclic relation.

14. In a machine for making garment hangers of the type comprising a wire member having a pair of downwardly divergent arms, and an elongated strut formed of relatively thick material bridged between and carried by the arm ends, a hopper receiving a supply of the struts, means for guiding the struts in downward travel from such hopper, mechanism including an actuating lever for periodically advancing the struts successively downward in said guide means, a reciprocatory carriage for receiving the struts singly from the guide means at one limit of carriage reciprocation and delivering them cyclically to a hanger assembly position substantially at the other limit of reciprocation, the carriage having and presenting to the actuating lever a cam face for rocking the lever and thus downwardly advancing a strut as the carriage approaches its strut-receiving position, and means for reciprocating the carriage.

15. In a machine for making garment hangers of the type comprising a wire member having a pair of downwardly divergent arms, and an elongated tubular strut formed of relatively thick material bridged between and carried by the arm ends, a hopper receiving a supply of the struts, a carriage for receiving struts from the hopper and delivering them singly to a hanger assembly position, means for guiding and actuating the carriage in a definite travel, a pair of pins installed on the carriage for insertion in the ends of a strut to maintain its delivery position, and means for automatically inserting such pins in or withdrawing them from a strut according as the carriage is at the strut receiving or delivering limit of its travel.

16. A machine for making garment hangers as set forth in claim 15, the last mentioned means including a pair of levers pivoted on the carriage and respectively carrying the respective pins.

17. In a machine for making garment hangers of the type comprising a wire member having a pair of downwardly divergent arms, and a strut formed of relatively thick material bridged between and carried by the arm ends, the combination with a carriage for receiving struts and delivering them singly to a hanger assembly position, of means for guiding and actuating the carriage in a definite travel, means for delivering struts singly to the carriage at one limit of its travel, a hopper receiving elongated blanks for forming the wire members, means for receiving said blanks from said hopper and fashioning them with the divergent arms and with end portions substantially parallel to the direction of carriage travel, such travel impaling on said end portions a strut delivered by the carriage, and such end portions having clinching extensions beyond the impaled strut, a pair of dies carried by the carriage to clinch said extensions, actuating elements for said dies mounted independently of carriage travel, the dies being disposed in an actuated relation to such elements by advancement of the carriage to its hanger assembly position, and means for actuating said elements in a cyclic relation to carriage travel.

18. In a machine for making garment hangers of the type comprising a wire member having a pair of downwardly diverging arms and a supporting hook at the juncture of said arms, and a strut formed of relatively thick material bridged between and carried by the relatively remote ends of such arms, the combination with a hopper receiving substantially rectilinear blanks for forming said wire members, of mechanism for feeding the blanks singly from the hopper, mechanism for shaping the blanks successively to form their divergent arms and said hooks and for establishing the shaped blanks in a hanger assembly position, a carriage reciprocatory between a strut-receiving position and said hanger assembly position, a strut receiving hopper, mechanism for feeding the struts singly from the strut hopper to the carriage, means on the carriage for retaining a strut thereon in a required position, mechanism effective in said assembly position for securing each strut at its ends substantially rigidly to the ends of a shaped wire blank in a bridging relation to the arms of the blank, and means for actuating said mechanisms and carriage in a predetermined cyclic relation.

19. In a machine as set forth in claim 8, means including a pair of actuating elements on the carriage for attaching both ends of a strut received by the carriage to a wire member, as the carriage approaches said assembly-forming position.

References Cited in the file of this patent
UNITED STATES PATENTS

| | | |
|---|---|---|
| 714,175 | Haley | Nov. 25, 1902 |
| 788,816 | Beyer | May 2, 1905 |
| 922,248 | Bilgram | May 18, 1909 |
| 1,132,026 | Niggli | Mar. 16, 1915 |
| 1,264,901 | Craig | May 7, 1918 |
| 1,512,430 | Loy | Oct. 21, 1924 |
| 1,575,037 | Chalmers | Mar. 2, 1926 |
| 1,586,310 | Johnson | May 25, 1926 |
| 2,041,805 | Backer | May 26, 1936 |
| 2,167,049 | Maurath | July 25, 1939 |
| 2,272,700 | Gorman | Feb. 10, 1942 |
| 2,439,548 | Planeta | Apr. 13, 1948 |
| 2,525,805 | Kirkpatrick | Oct. 17, 1950 |
| 2,561,912 | Dayton | July 24, 1951 |
| 2,591,203 | Schmalz | Apr. 1, 1952 |
| 2,709,462 | Schade | May 31, 1955 |
| 2,718,320 | Nelson et al. | Sept. 20, 1955 |
| 2,722,005 | Tuttle | Nov. 1, 1955 |

FOREIGN PATENTS

| | | |
|---|---|---|
| 12,012 | Great Britain | June 12, 1901 |